(12) United States Patent
Ishibashi et al.

(10) Patent No.: US 7,121,083 B2
(45) Date of Patent: Oct. 17, 2006

(54) COMBUSTION CONTROL APPARATUS AND METHOD FOR INTERNAL COMBUSTION ENGINE

(75) Inventors: Yasutaka Ishibashi, Kanagawa (JP); Manabu Miura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 160 days.

(21) Appl. No.: 10/895,407

(22) Filed: Jul. 21, 2004

(65) Prior Publication Data

US 2005/0039442 A1  Feb. 24, 2005

(30) Foreign Application Priority Data

Jul. 25, 2003 (JP) .............................. 2003-279629

(51) Int. Cl.
*F01N 3/00* (2006.01)

(52) U.S. Cl. ............................ 60/285; 60/286; 60/295; 60/297

(58) Field of Classification Search .................. 60/285, 60/286, 295, 297, 300
See application file for complete search history.

(56) References Cited

U.S. PATENT DOCUMENTS

| | | | |
|---|---|---|---|
| 5,315,823 A * | 5/1994 | Nishikawa et al. | 60/286 |
| 5,473,887 A | 12/1995 | Takeshima et al. | |
| 5,529,043 A * | 6/1996 | Nagaishi et al. | 123/478 |
| 5,975,046 A * | 11/1999 | Kaneko et al. | 123/300 |
| 6,082,100 A | 7/2000 | Boegner et al. | |
| 6,178,943 B1 * | 1/2001 | Taga et al. | 123/295 |
| 6,378,297 B1 * | 4/2002 | Ito et al. | 60/284 |
| 6,378,298 B1 * | 4/2002 | Harima et al. | 60/288 |
| 6,588,203 B1 * | 7/2003 | Hirota et al. | 60/297 |
| 6,901,747 B1 * | 6/2005 | Tashiro et al. | 60/286 |

FOREIGN PATENT DOCUMENTS

| | | |
|---|---|---|
| EP | 0 887 535 A2 | 12/1998 |
| EP | 1 363 009 A1 | 11/2003 |
| JP | 59-194020 A | 11/1984 |
| JP | 61-197710 A | 9/1986 |
| JP | 2600492 B2 | 1/1997 |
| JP | 2000-320386 A | 11/2000 |
| WO | WO 02/066813 A1 | 8/2002 |

OTHER PUBLICATIONS

U.S. Appl. No. 10/895,423, filed Jul. 21, 2004, Kitahara.
U.S. Appl. No. 10/895,424, filed Jul. 21, 2004, Nishizawa et al.
U.S. Appl. No. 10/902,422, filed Jul. 30, 2004, Nishizawa et al.

(Continued)

*Primary Examiner*—Thomas Denion
*Assistant Examiner*—Loren Edwards
(74) *Attorney, Agent, or Firm*—Foley & Lardner LLP

(57) ABSTRACT

A combustion control apparatus for an internal combustion engine having an exhaust gas purifier in an exhaust passage, includes a controller that controls supply of fuel and air to the engine. The controller is configured to produce preliminary combustion at or near compression top dead center and main combustion after an end of the preliminary combustion under a predetermined condition based on a condition of the exhaust gas purifier. The controller is further configured to determine a target intake air quantity by adding an increase correction to the target intake air quantity based on a torque correction value and determine a target fuel injection quantity by calculating the target fuel injection quantity from an actual air quantity and a target air/fuel ratio. A combustion control method is also provided.

25 Claims, 21 Drawing Sheets

OTHER PUBLICATIONS

U.S. Appl. No. 10/895,286, filed Jul. 21, 2004, Kitahara.
U.S. Appl. No. 10/895,335, filed Jul. 21, 2004, Kitahara.
U.S. Appl. No. 10/902,163, filed Jul. 30, 2004, Kitahara.
U.S. Appl. No. 10/895,409, filed Jul. 21, 2004, Kitahara.
U.S. Appl. No. 10/895,408, filed Jul. 21, 2004, Kitahara.
U.S. Appl. No. 10/902,162, filed Jul. 30, 2004, Todoroki et al.

* cited by examiner

TARGET FUEL INJECTION TIMING FOR PRELIMINARY COMBUSTION

TARGET FUEL INJECTION QUANITY FOR PRELIMINARY COMBUSTION

TARGET FUEL INJECTION TIMING
FOR MAIN COMBUSTION

COMBUSTION CONTROL APPARATUS AND METHOD FOR INTERNAL COMBUSTION ENGINE

BACKGROUND OF THE INVENTION

The present invention relates to a combustion control apparatus and method for an internal combustion engine.

It is heretofore known a diesel engine fuel injection system in which a fuel injector splits injection of fuel into three separate shots at or near compression top dead center of each cylinder when it is required to promote activation of catalyst as disclosed in Japanese Unexamined Patent Publication No. 2000-320386.

SUMMARY OF THE INVENTION

However, in the fuel injection system disclosed in the above-described Japanese Patent Publication, fuel is injected so as to cause combustion of fuel of the three separate shots to occur continuously. Namely, fuel is injected into a flame of fuel of the first shot so that fuel injected at or after the second shot mainly causes diffusive combustion. When the air/fuel ratio is made richer at such a combustion condition, considerable increase of smoke emission is inevitably or unavoidably caused.

It is accordingly an object of the present invention to provide a combustion control apparatus and method for an internal combustion engine which can realize such combustion that does not increase smoke emission even when the air/fuel ratio is made richer for raising the exhaust gas temperature.

To achieve the above object, there is provided according to an aspect of the present invention provides a combustion control apparatus for an internal combustion engine having an exhaust gas purifier in an exhaust passage, comprising a controller that controls supply of fuel and air to the engine, the controller being configured to produce preliminary combustion at or near compression top dead center and main combustion after an end of the preliminary combustion under a predetermined condition based on a condition of the exhaust gas purifier, the controller being further configured to determine a target intake air quantity by adding an increase correction to the target intake air quantity based on a torque correction value and determine a target fuel injection quantity by calculating the target fuel injection quantity from an actual air quantity and a target air/fuel ratio.

According to another aspect of the present invention, there is provided a combustion control method for an internal combustion engine having an exhaust gas purifier disposed in an exhaust passage, the method comprising producing preliminary combustion at or near compression top dead center and main combustion after an end of the preliminary combustion under a predetermined condition based on a condition of the exhaust gas purifier, and determining a target intake air quantity by adding an increase correction to the target intake air quantity based on a torque correction value and determining a target fuel injection quantity by calculating the target fuel injection quantity from an actual air quantity and a target air/fuel ratio.

DESCRIPTION OF THE PREFERRED EMBODIMENTS

Figure 1:
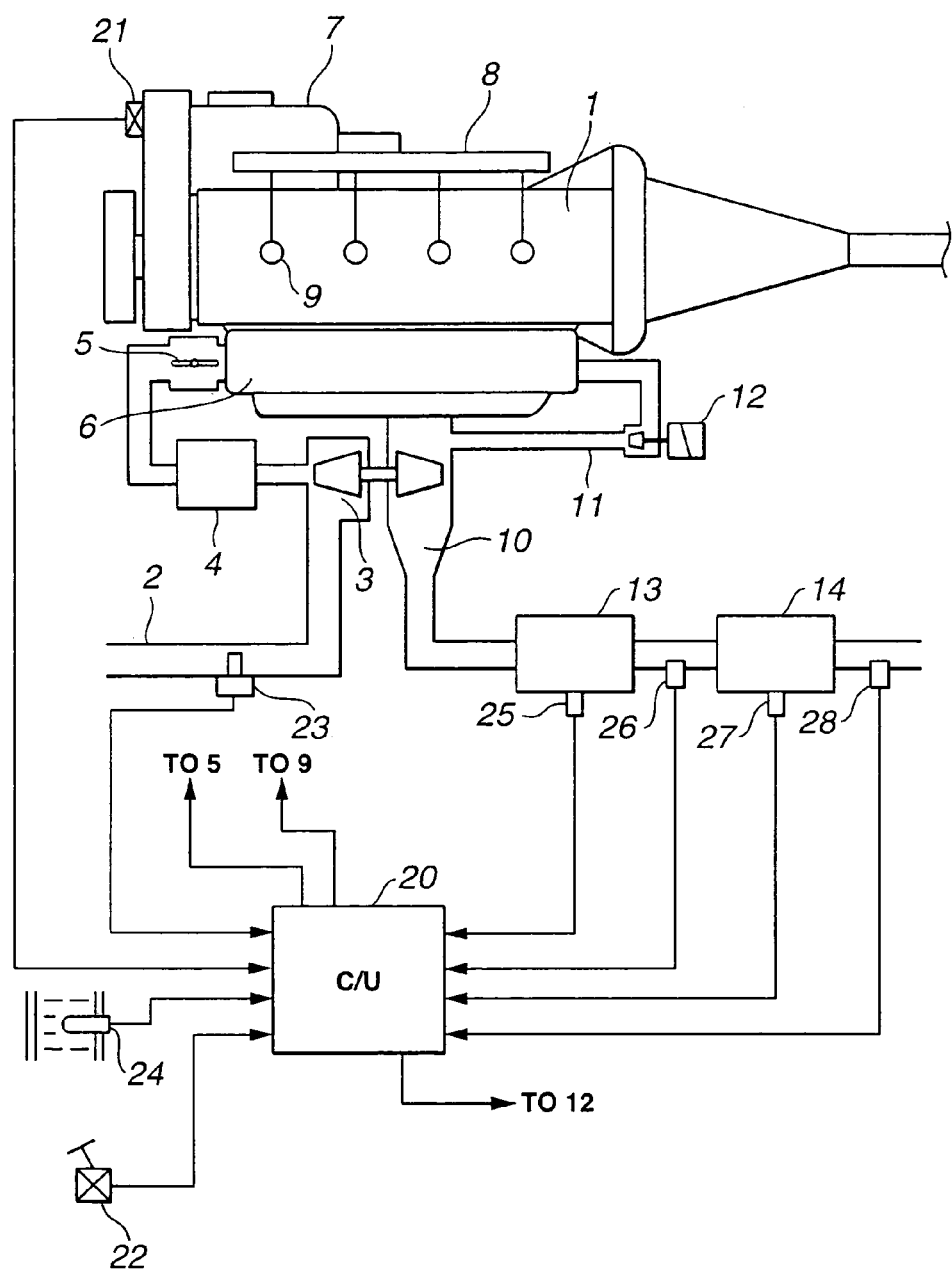
FIG. 1 is a system block diagram of an internal combustion engine according to an embodiment of the present invention.

Referring first to FIG. 1, an internal combustion engine (herein shown as diesel engine) according to an embodiment of the present invention will be described.

Diesel engine 1 has at intake passage 2 an intake compressor of variable nozzle type turbocharger 3 so that intake air is supercharged by the compressor and cooled at intercooler 4, then passes intake throttle valve 5 and thereafter flows through collector 6 into a combustion chamber of each cylinder. Fuel is pressurized and delivered to common rail 8 by a common rail type fuel injection system, namely, by high-pressure fuel pump 7 and injected directly into a combustion chamber from fuel injector 9 of each cylinder. A mixture of air drawn into the combustion chamber and fuel injected is burned by compression ignition, and exhaust gas is discharged into exhaust passage 10.

A part of exhaust gas discharged into exhaust passage 10 is returned through EGR passage 11 to an intake side by way of EGR valve 12. The remaining of the exhaust gas passes an exhaust turbine of variable nozzle type turbocharger 3 to drive the same.

Herein, downstream of the exhaust gas turbine in exhaust passage 10 is disposed NOx trap catalyst 13 that traps NOx in the exhaust gas when an exhaust air/fuel ratio is lean and purging the trapped NOx when the exhaust air/fuel ratio is rich. Further, NOx trap catalyst 13 carries an oxidation catalyst (noble metal) so as to have a function of oxidizing exhaust components (HC, CO) flowing thereinto.

Further, downstream of NOx trap catalyst 13 is disposed diesel particulate filter (hereinafter also referred to as DPF) 14. DPF 14 also carries an oxidation catalyst (noble metal) so as to have a function of oxidizing exhaust gas components (HC, CO) flowing thereinto. In the meantime, NOx trap catalyst 13 and DPF 14 may be disposed reversely, and the DPF may carries thereon the NOx trap catalyst so as to constitute an integral unit.

Inputted to control unit 20 for controlling engine 1 are signals from engine speed sensor 21 for detecting engine speed Ne, accelerator opening degree sensor 22 for detecting accelerator opening degree APO, airflow meter 23 for detecting an intake air quantity Qac and water temperature sensor 24 for detecting cooling water temperature Tw.

Further provided are catalyst temperature sensor 25 for detecting the temperature (catalyst temperature) of NOx trap catalyst 13, exhaust pressure sensor 26 for detecting an exhaust pressure at an inlet side of DPF 14 of exhaust passage 10, DPF temperature sensor 27 for detecting the temperature (DPF temperature) of DPF 14 and air/fuel ratio sensor 28 for detecting an exhaust air fuel ratio (hereinafter referred to as exhaust λ and its numerical value is represented by an excess air ratio) at an outlet side of DPF 14, and signals from those sensors are also inputted to control unit 20. However, the temperature of NOx trap catalyst 13 and the temperature of DPF 14 may be detected indirectly from the exhaust gas temperature by means of exhaust gas temperature sensors (not shown) disposed downstream of NOx trap catalyst 13 and DPF 14.

Based on those signals, control unit 20 outputs a fuel injection instruction signal to fuel injector 9 for controlling a fuel injection quantity and a fuel injection timing of each fuel injector 9, an opening degree instruction signal to intake throttle valve 5, an opening degree instruction signal to EGR valve 12, etc.

Herein, control unit 20 executes an exhaust purifying control including a control for regeneration of DPF 14 by burning off PM trapped by and accumulated on DPF 14, a control for purging NOx trapped by NOx trap catalyst 13 and a control for releasing S(sulfur)-poisoning of NOx trap catalyst 13, and such an exhaust gas purifying control will be described in detail hereinafter.

FIGS. 2 to 12 are flowcharts showing an exhaust purifying control that is executed in control unit 20.

Figure 2:
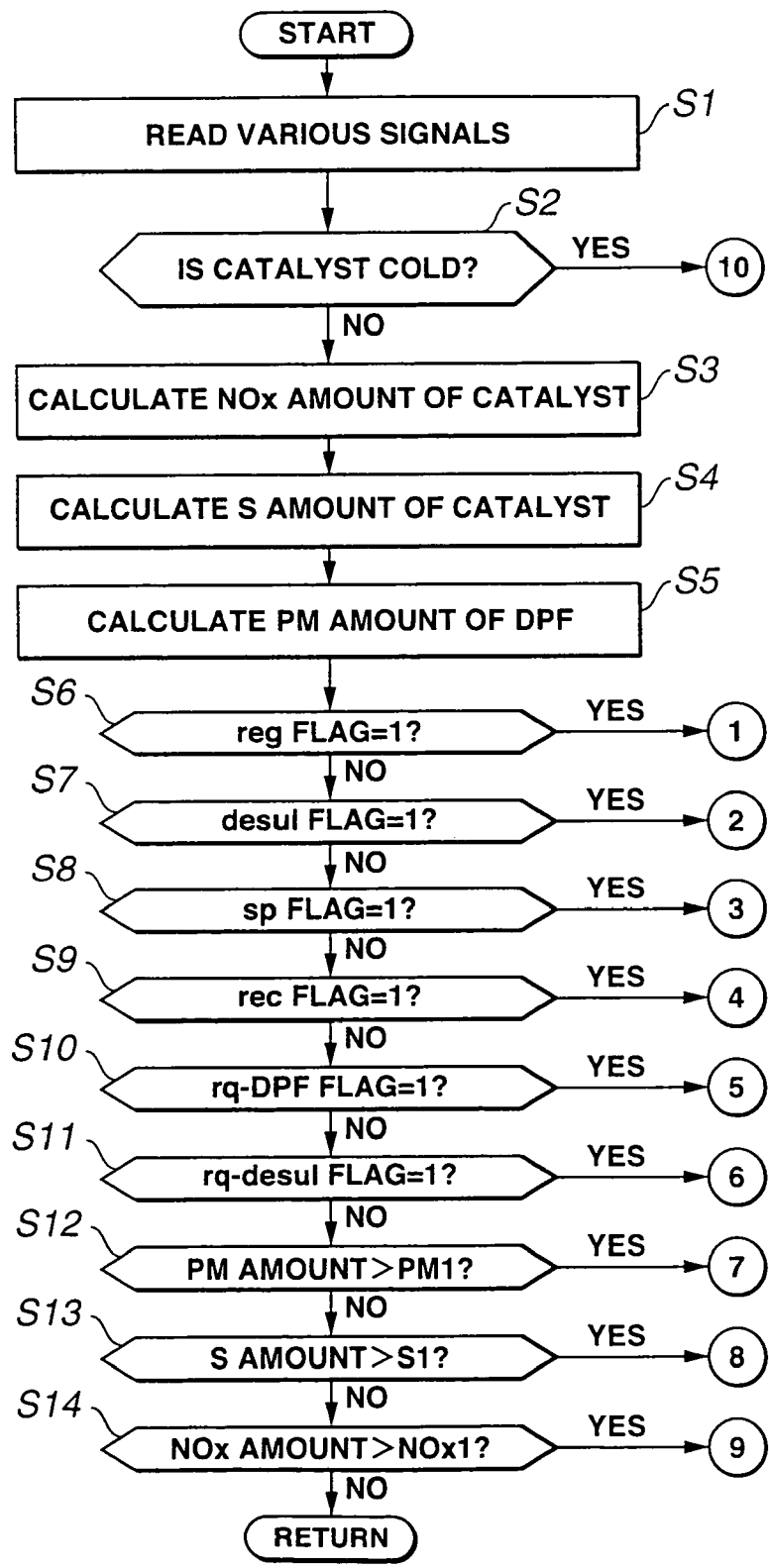
FIG. 2 is a flowchart (part 1) showing an exhaust gas purification control.

Referring first to the flowchart of FIG. 2, the exhaust purifying control will be described.

In step S1, various sensor signals are read to detect engine speed Ne, accelerator opening degree APO, intake air quantity Qac, catalyst temperature, DPF inlet side pressure, DPF temperature, DPF outlet side temperature and DPF outlet side exhaust λ.

In step S2, it is determined whether or not NOx trap catalyst 13 in the exhaust system is in a cold condition or in a hot condition. When the catalyst temperature is equal to or lower than T5 which is an activation temperature of NOx trap catalyst 13, it is determined that NOx trap catalyst 13 is in a cold condition, and the processing goes to a control for a warm-up promoting mode in FIG. 12 which will be described later. When it is determined that NOx trap catalyst 13 is in a hot condition, the processing goes to step S3.

In step S3, a NOx amount, i.e. an amount of NOx trapped by and accumulated on NOx trap catalyst 13 is calculated. For example, similarly to the calculation of the amount of absorption of NOx disclosed in column 8 of U.S. Pat. No. 5,437,887, the amount of NOx may be estimated from a cumulative value of engine speed (i.e., cumulative value of the number of revolutions of the crankshaft) or running distance. In case a cumulative value is used, the cumulative value is reset at the time when NOx purge is completed (including the time when NOx purge is attained together with S-poisoning release).

In step S4, sulfur accumulation amount (hereinafter referred to simply as S amount) that is an amount of sulfur accumulated on NOx trap catalyst 13 due to S-poisoning is calculated. In this connection, similarly to the calculation of the above-described NOx amount, the S amount can be estimated from a cumulative value of engine speed or running distance. In case a cumulative value is used, the cumulative value is reset when S-poisoning release is completed.

In step S5, a PM amount, i.e., an amount of PM trapped by and accumulated on DPF 14 is calculated in the following manner. As the PM amount increases, the DPF outlet side exhaust pressure increases naturally. Thus, the DPF outlet side exhaust pressure is detected by exhaust pressure sensor 26 and compared with a standard exhaust pressure, thereby estimating the PM amount. In the meantime, it will do to estimate the PM amount by combining a cumulative value of engine speed or running distance from the previous regeneration of DPF 14 and the exhaust pressure.

In step S6, it is determined whether a reg flag indicating that DPF regeneration is in progress is set. In case the reg flag is set (=1), the processing goes to a DPF regeneration mode control in FIG. 3 which will be described later.

In step S7, it is determined whether or not a desul flag indicating that S-poisoning release is in progress is set. In case the desul flag is set (=1), the processing goes to a control for a S-poisoning release mode in FIG. 4 which will be described later.

In step S8, it is determined whether or not an sp flag indicating that a rich spike mode for purging NOx trap of NOx trap catalyst 13 is in progress is set. In case the sp flag is set (=1), the processing goes to a control for a rich spike mode in FIG. 5 which will be described later.

In step S9, it is determined whether a rec flag indicating that a fusion damage preventing mode after regeneration of DPF 14 and s-poisoning release is in progress is set. In case the sp flag is set (=1), the processing goes to a control for a fusion damage preventing mode in FIG. 6 which will be described later.

In step S10, it is determined whether or not a rq-DPF flag indicating that regeneration of DPF 14 is requested is set. In case regeneration of DPF 14 is requested so that the rq-DPF flag is set (=1), the processing goes to the flow of FIG. 7 which will be described later where a priority order for regeneration in case regeneration of DPF 14 is requested.

In step S11, it is determined whether or not the rq-desul flag indicating that S-poisoning release is requested is set. In case the rq-desul flag is set (=1), i.e., S-poisoning release is requested, the processing goes to the flow in FIG. 8 which will be described later where it is determined a priority order for regeneration in case S-poisoning release is requested.

In step S12, it is determined whether or not the PM amount of DPF 14 calculated in step S5 exceeds PM1 and it is the time to regenerate DPF 14.

Figure 9:
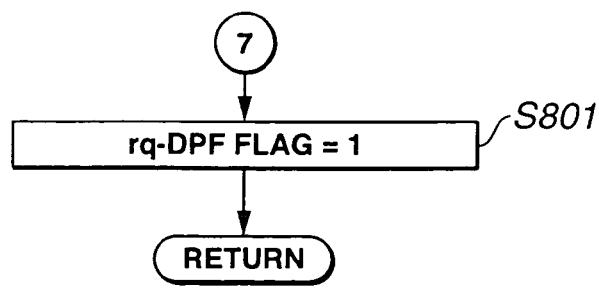
FIG. 9 is a flowchart (part 8) showing an exhaust gas purification control.

In case the PM amount>PM1 so that it is determined that it is the time to regenerate DPF 14, the processing goes to the flow of FIG. 9 where in step S701 the rq-DEF flag is set (=1) to request regeneration of DPF 14.

In step S13, it is determined whether or not the S amount of NOx trap catalyst 13 calculated in step S4 exceeds a predetermined amount S1 and it is the time to release S-poisoning.

Figure 10:
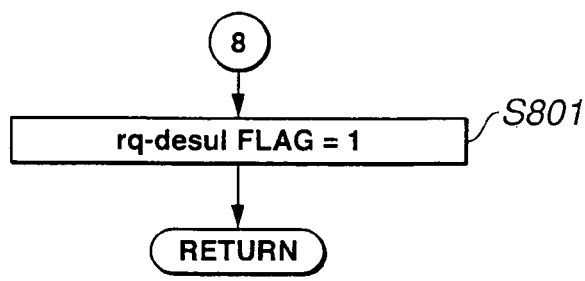
FIG. 10 is a flowchart (part 9) showing an exhaust gas purification control.

In case the S amount>S1 so that it is determined that the time for releasing S-poisoning of NOx trap catalyst 13 has come, the processing goes to the flow of FIG. 10 where in step S801 the rq-desul flag is set (=1) to request S-poisoning release.

In step S14, it is determined whether or not the NOx amount of NOx trap catalyst 13 calculated in step S3 exceeds a predetermined amount NOx1 and it is the time to purge the NOx trap.

Figure 11:
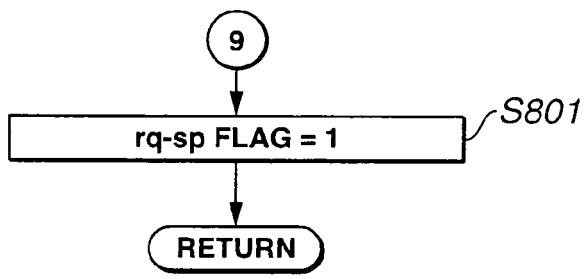
FIG. 11 is a flowchart (part 10) showing an exhaust gas purification control.

In case the NOx amount>NOx1 so that it is determined that it is the time for purging the NOx trap of NOx trap catalyst 13, the processing goes to the flow of FIG. 11 where in step S901 the rq-sp flag is set (=1) to make a NOx trap purge request (rich spike request).

Figure 3:
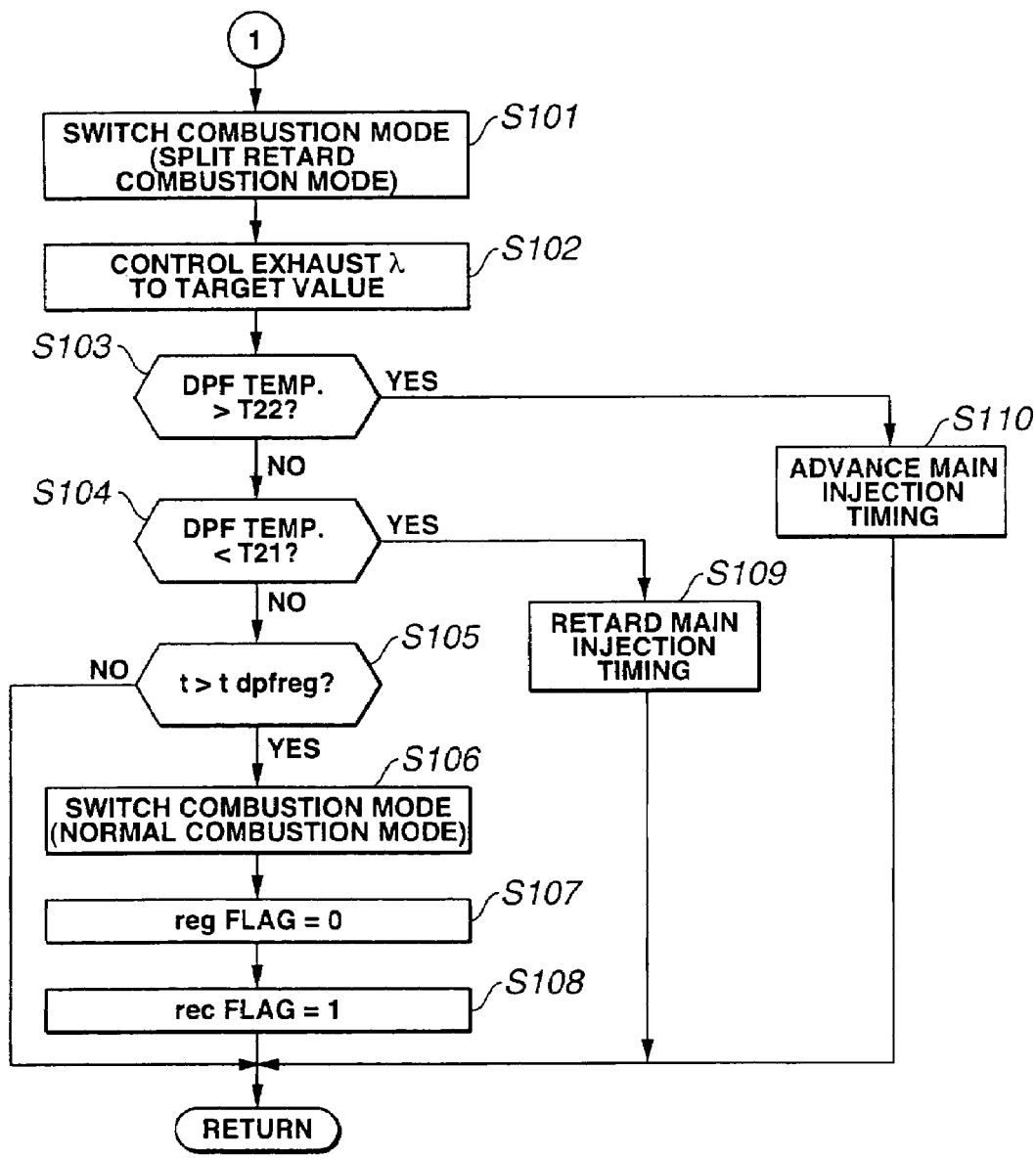
FIG. 3 is a flowchart (part 2) showing an exhaust gas purification control.

Then, the control for the DPF regeneration mode of FIG. 3 will be described. If the PM amount exceeds a predetermined amount PM1 so that the rq-DPF flag is set (=1) and in response to this the flow of FIG. 7, which will be described later, is executed so that the reg flag is set (=1), the processing flow of FIG. 3 is started.

In step S101, for regeneration of DPF 14, the combustion mode of the engine is switched from a normal lean combustion mode to a split retard combustion mode according to the present invention.

Herein, the split retard combustion mode according to the present invention will be described. In the meantime, the split retard combustion mode is used for, other than regeneration of DPF 14, S-poisoning release, purging of NOx trap (rich spike) and promotion of engine warm-up, In case regeneration of DPF 14 is performed, it is necessary to hold the exhaust λ between 1 to 1.4 and the temperature of DPF 14 at 600° or higher. Further, in case S-poisoning release is performed, it is necessary to realize that $\lambda \leq 1$ and the exhaust gas temperature $\geq 600°$ C.

In an operation range normally used under a lean condition, it is a usual practice to perform pilot injection. The pilot injection timing is BTDC 40 to 10° and the pilot injection quantity is 1 to 3 mm$^3$/st. The main injection timing is about BTDC 10 to –20° and the interval between the pilot injection and the main injection is set to be about 10 to 30° CA.

In order to realize, at normal operation of the engine, low λ and a high exhaust gas temperature for regeneration of DPF 14 and S-poisoning release, etc., it is necessary to decrease the intake air quantity. However, when the intake air quantity is decreased, the compression end temperature inside the cylinder is lowered so that the combustion becomes unstable. Thus, it is necessary to advance the injection timing of the main injection if the pilot injection is set similarly to the normal lean combustion mode (refer to the first example in FIG. 13). By such setting of the fuel injection quantity and injection timing, it is difficult to realize low λ and a high exhaust gas temperature due to limits of retard since retard of the injection timing for raising the exhaust gas temperature will cause unstable combustion.

Figure 14:
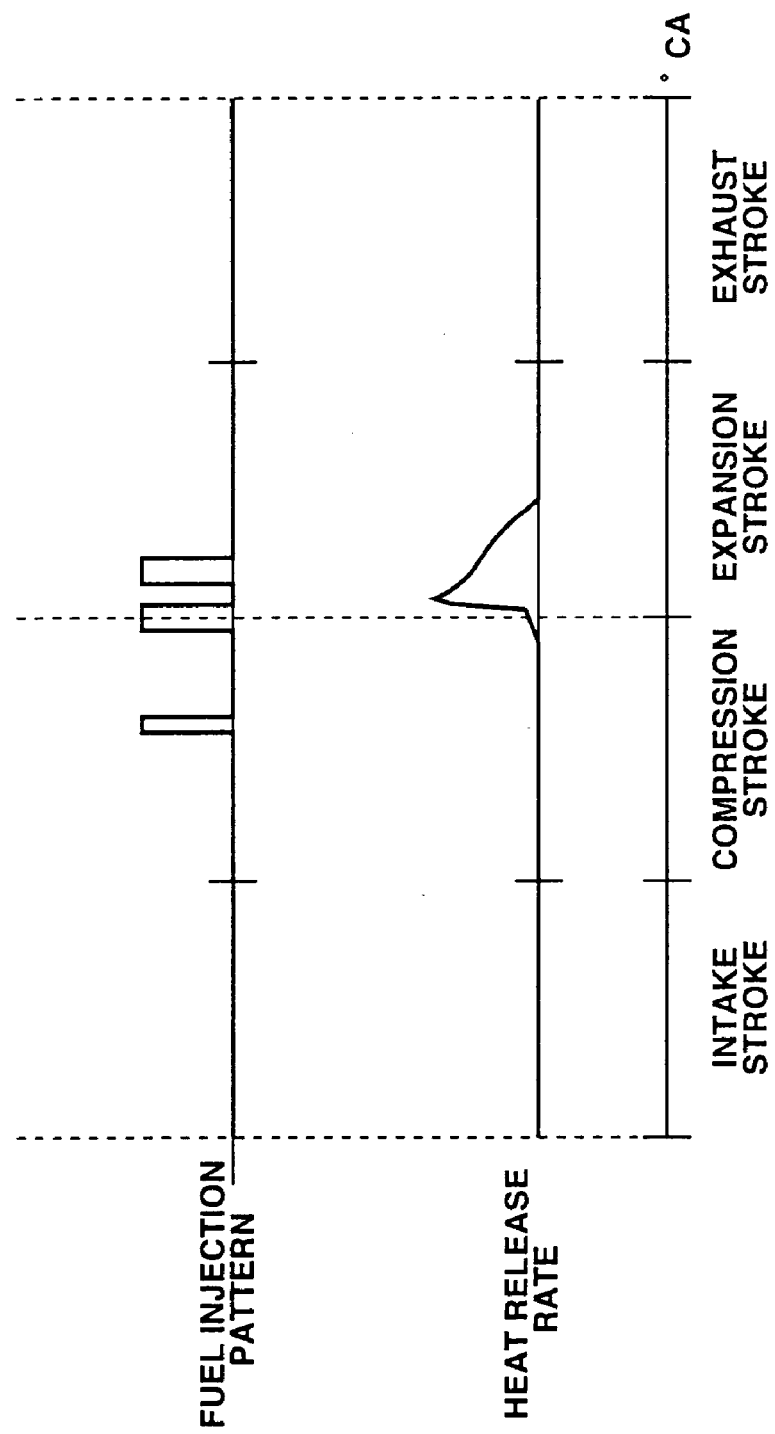
FIG. 14 is a time chart showing a second example of a combustion mode.

Thus, Unexamined Japanese Patent Publication No. 2000-320386 realizes low and high exhaust temperature by splitting the main injection and thereby expanding the limits of retard (refer to the second example of FIG. 14).

However, since under a condition where combustion of fuel of a previous shot or injection is active the next shot of fuel is made, continuous combustion as shown in FIG. 14 is caused. Namely, divided portions of fuel for the main combustion are injected into the flame of combustion of the previous injection, so that combustion starts right after fuel is injected, thus increasing the rate of diffusion combustion, causing the partial equivalence ratio to become very rich and therefore considerably increasing smoke emission.

Figure 15:
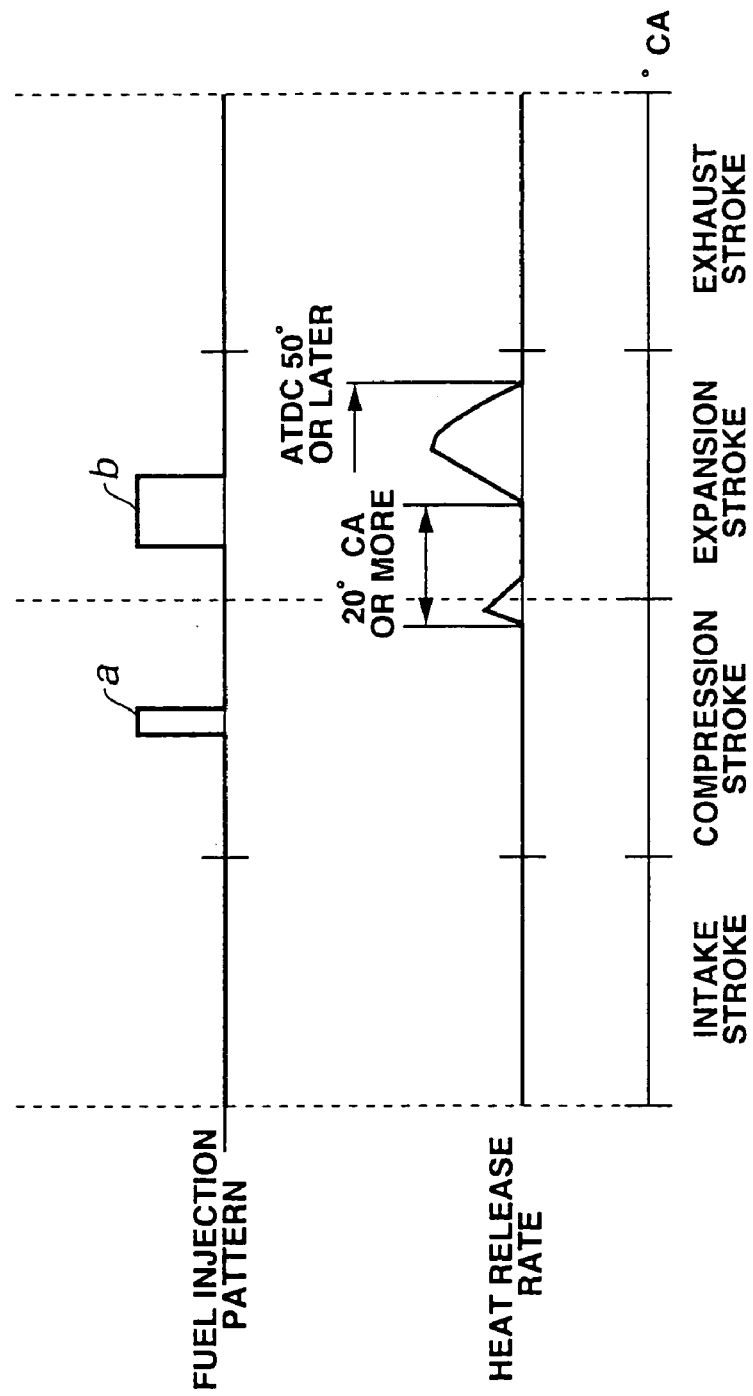
FIG. 15 is a time chart showing a combustion mode according to the present invention.

Thus, according to the present invention, main combustion for generating a main torque and preliminary combustion prior to the main combustion are performed as shown in FIG. 15. Namely, fuel injections (a, b) are controlled so as to cause the preliminary combustion to occur near compression top dead center (TDC) and the main combustion to start after the preliminary combustion is completely finished.

Namely, injection (a) of fuel is performed during compression stroke for thereby performing the preliminary combustion for elevating incylinder temperature adjacent TDC (compression end temperature) Although the injection quantity of fuel for generating heat of the preliminary combustion varies depending upon a variation of the engine operating condition, at least such a quantity of fuel is injected that enables generation of heat by the preliminary combustion to be perceived and the incylinder temperature at the time of fuel injection for the main combustion to be higher than a self-ignitable temperature. Further, by changing the fuel injection quantity and injection timing for the preliminary combustion in accordance with the compression end temperature that is estimated based upon the engine operating condition, the stability of the preliminary combustion can be improved.

Then, injection (b) of fuel for the main combustion is performed after TDC so that the main combustion starts after the preliminary combustion is completely finished.

Namely, by raising the incylinder temperature by the preliminary combustion, the retard limit of the main combustion is expanded for thereby improving the controllability in control of the exhaust gas temperature to a target temperature, while on the other hand, by injecting fuel for the main combustion after the preliminary combustion is completely finished, a period of time for retard of ignition for the main combustion is attained thereby making higher the rate of premixed combustion in the main combustion and suppressing smoke emission.

The interval between a combustion start timing of the preliminary combustion and a combustion start timing of the main combustion is at least 20° CA though varies depending upon a variation of engine speed since if not, the preliminary combustion (the heat release by the preliminary combustion) is not finished completely. By setting the interval in this manner, deterioration of the main combustion can be suppressed, thus making it possible to prevent deterioration in smoke emission. Further, since the main combustion starts during expansion stroke, the combustion speed is very slow so that the main combustion is finished at ATDC 50° or later. By retarding the combustion end timing of the main combustion as much as possible, the main combustion becomes slow, thus making it possible to suppress deterioration in combustion noise.

Figure 13:
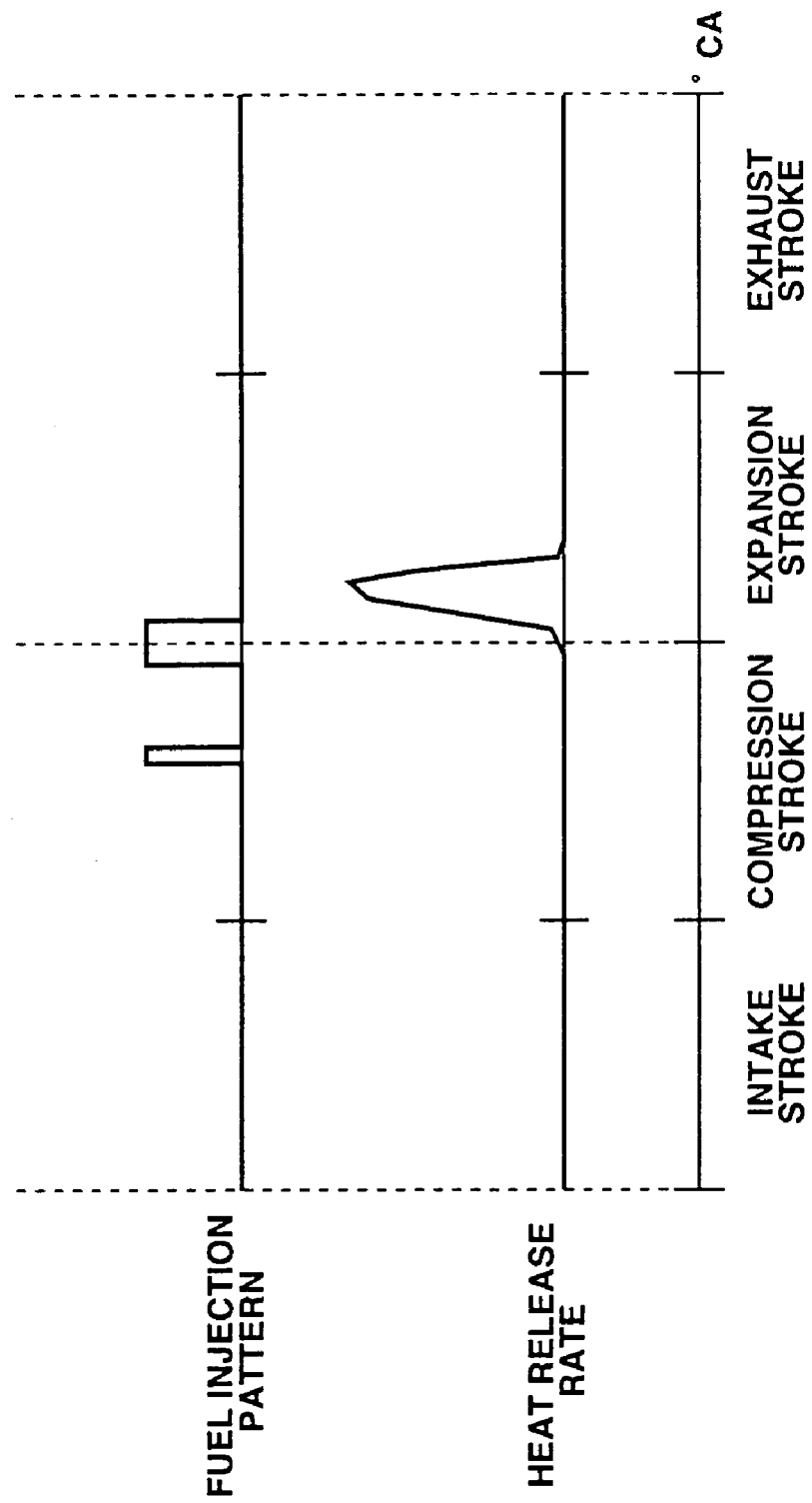
FIG. 13 is a time chart showing a first example of a combustion mode.
Figure 16:
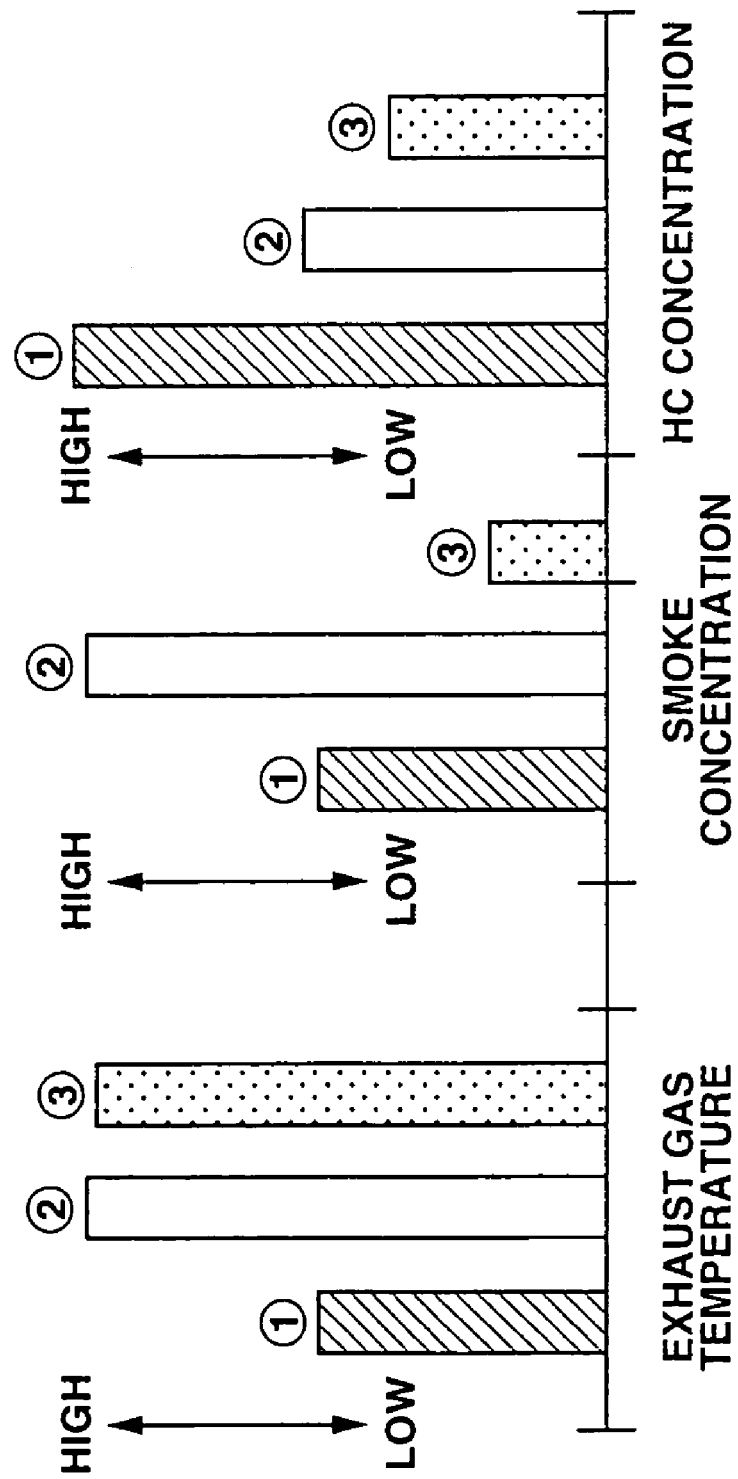
FIG. 16 is a view showing a comparison of the present invention indicated by ③ with the first example indicated by ① and second example indicated by ② on an exhaust gas condition.
Figure 17A:
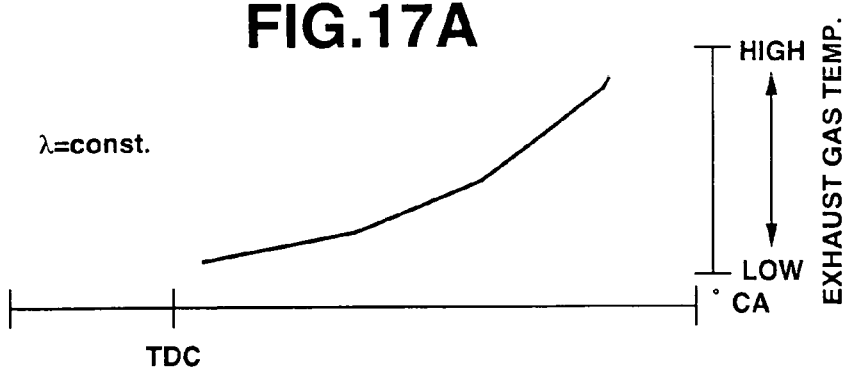
FIGS. 17A to 17D are views showing a relation between a main combustion timing and an exhaust gas condition.
Figure 17B:
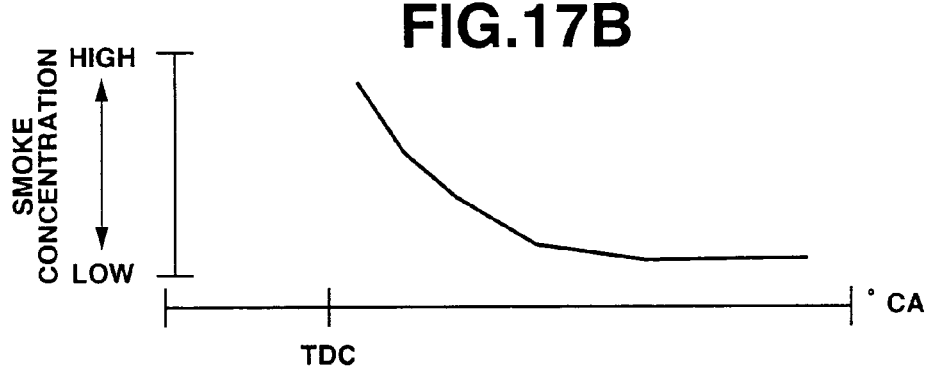
Figure 17C:
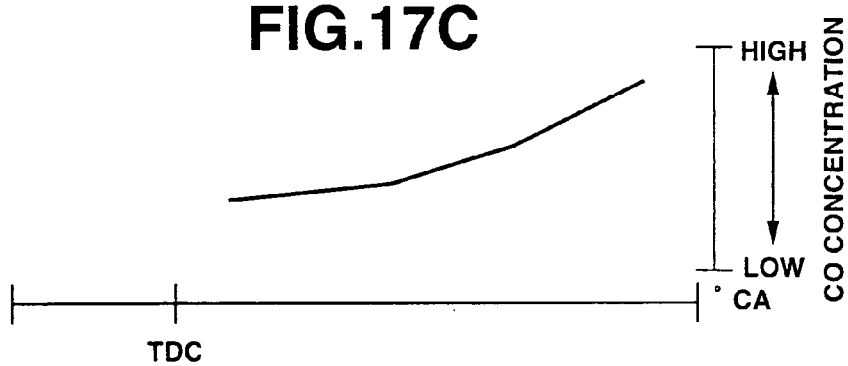
Figure 17D:
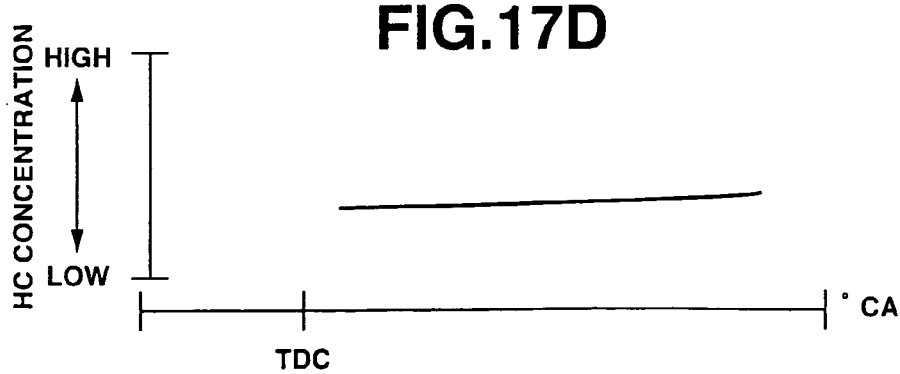

By realizing the split retard combustion of the present invention, as indicated by ③ in FIG. 16, combustion of a high exhaust gas temperature and low smoke emission can be attained even when a rich condition is realized, as compared with the first and second examples of FIGS. 13, 14 indicated by ①, ②, respectively. Further, the split retard combustion of this invention exhibits a very low HC concentration.

Further, since the retard limit of the main combustion is expanded by the preliminary combustion, combustion under a low λ condition can be stable even when the injection timing of the main combustion is retarded, thus making it possible to attain a high exhaust gas temperature.

Referring to FIGS. 17A to 17D, retard of the timing of the main combustion increases the ratio of premixed combustion in the main combustion, so that even under a condition where λ is small, the more the timing of the main combustion is retarded, the more smoke emission is suppressed. Further, if the timing of the main combustion is retarded, a higher exhaust temperature can be realized. Thus, by changing the fuel injection timing for the main combustion, the exhaust temperature can be controlled.

Figure 18:
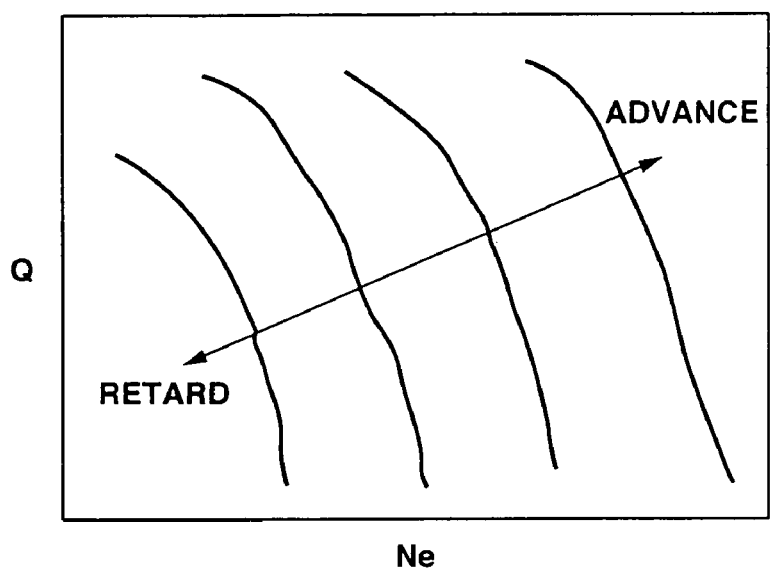
FIG. 18 is a view showing a target fuel injection timing for preliminary combustion.

FIG. 18 shows a target fuel injection timing for the preliminary combustion by using an engine operating condition (engine speed Ne and load Q) as a parameter.

Figure 19:
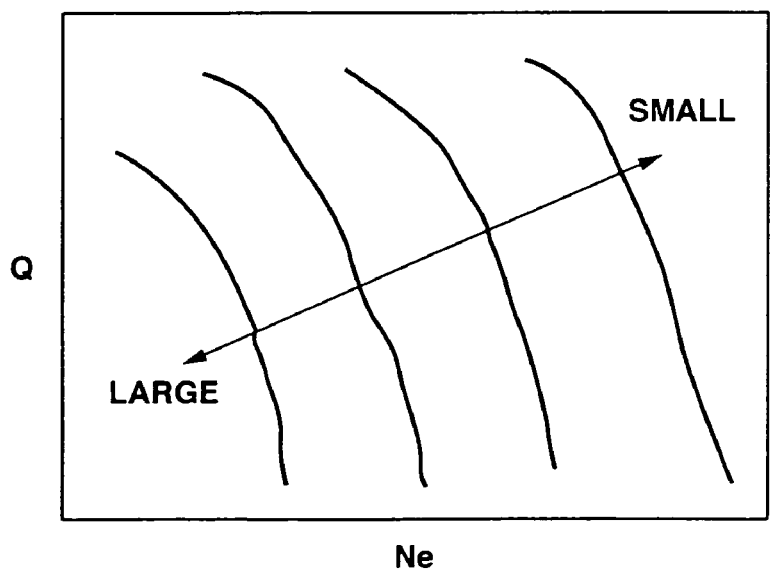
FIG. 19 is a view showing a target fuel injection quantity for preliminary combustion.

FIG. 19 shows a target fuel injection quantity for the preliminary combustion by using an engine operating condition (engine speed Ne and load Q) as a parameter.

Figure 20:
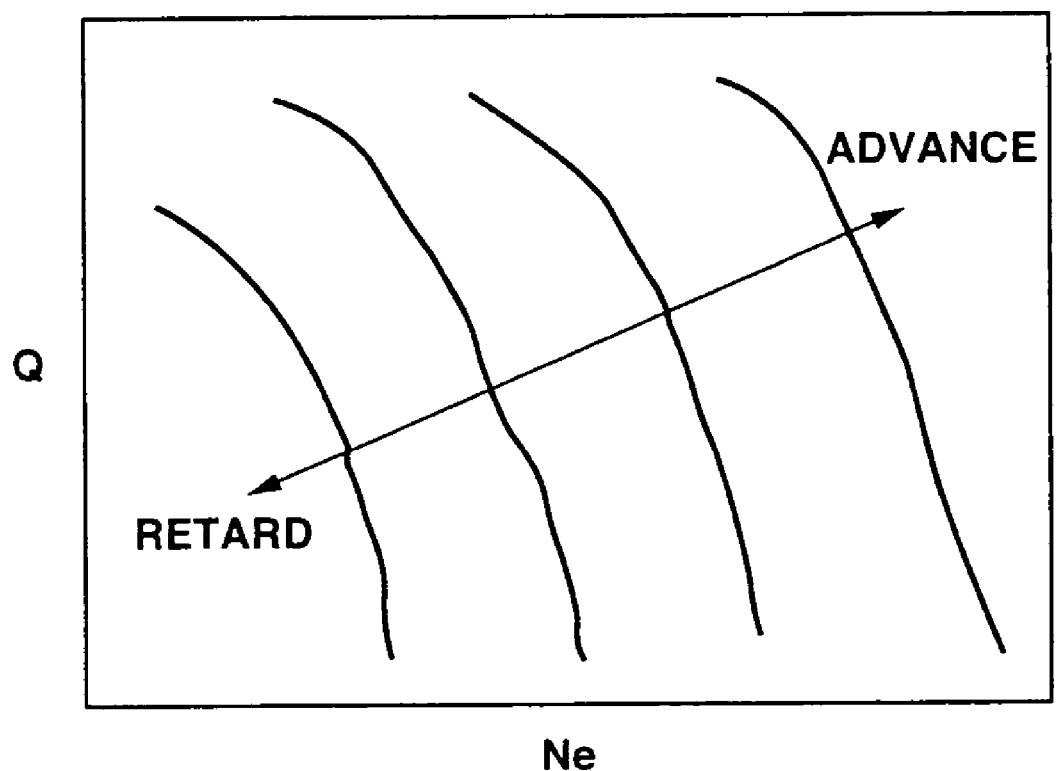
FIG. 20 is a view showing a target fuel injection timing for main combustion.

FIG. 20 shows a target fuel injection timing (main injection timing) for realizing a certain target exhaust gas temperature by using an engine operating condition (engine speed Ne and load Q) as a parameter. The target fuel injection quantity for the main combustion is determined, for correction of toque, in the manner as will be described later.

Figure 21:
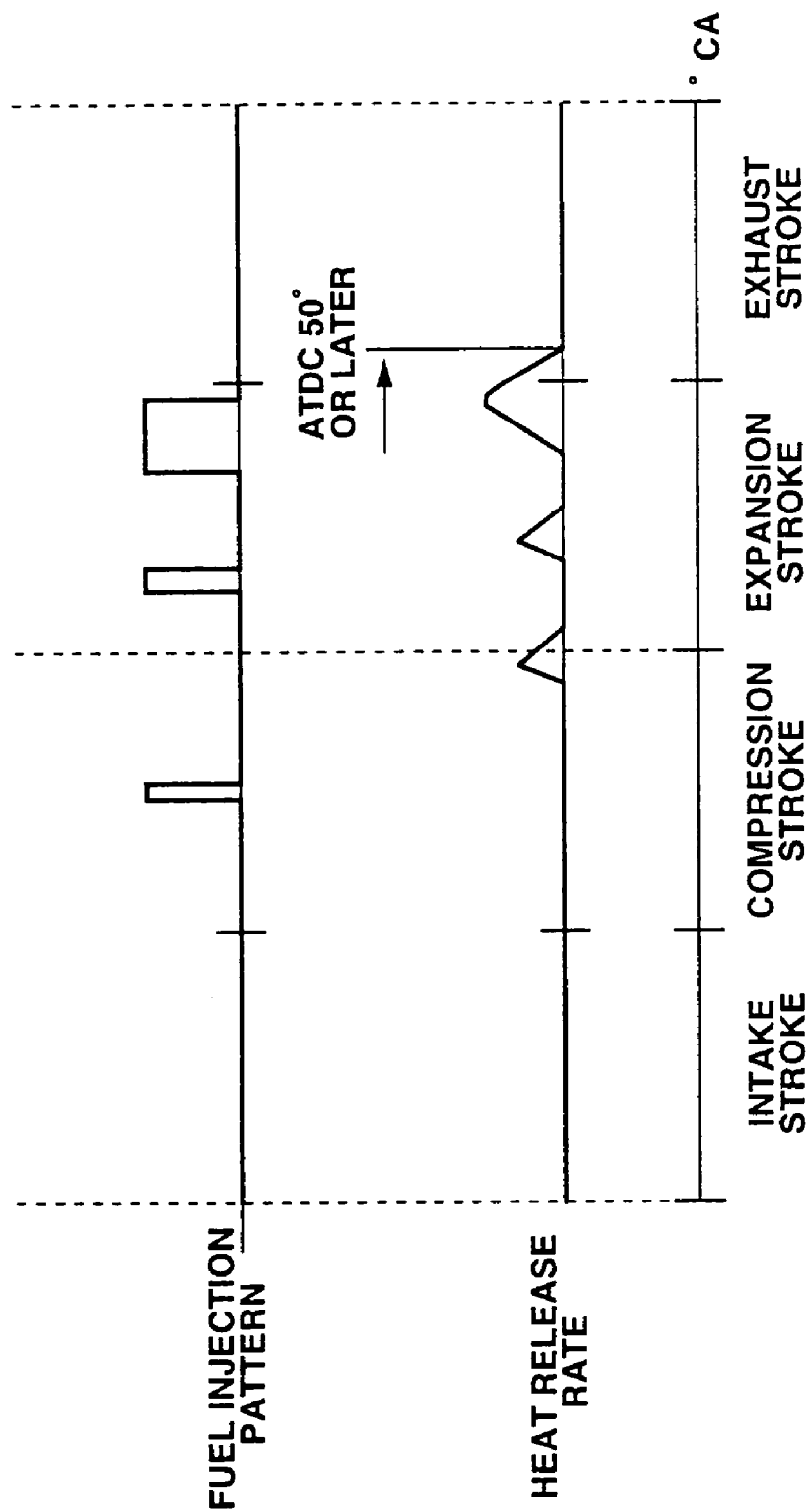
FIG. 21 is a time chart showing another combustion mode according to the present invention.

In the meantime, under a low load condition, the combustion timing of the main combustion for attaining the target exhaust gas temperature is retarded considerably, so that there occurs a case in which only one preliminary combustion cannot maintain the incylinder temperature at the injection timing of the main combustion high. In such a case, as shown in FIG. 21, preliminary combustion is performed plural times in such a manner that the heat release timings of the combustions do not overlap each other. By this, even under a low load condition, low smoke emission and high exhaust temperature can be attained at the same time.

Figure 22:
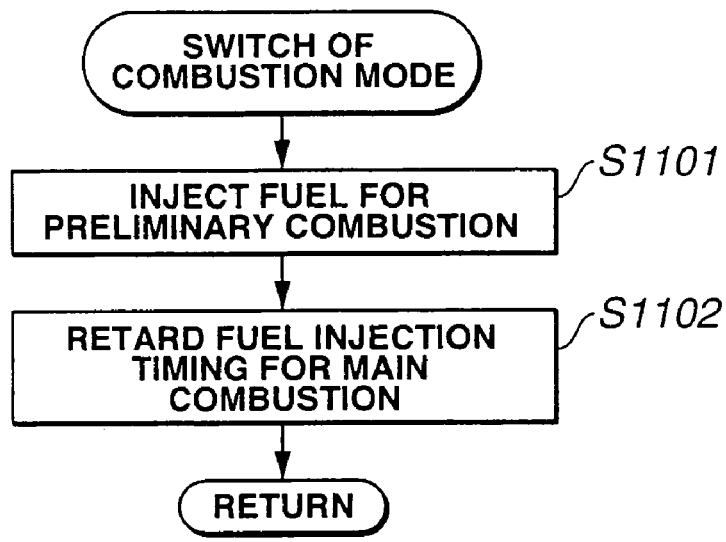
FIG. 22 is a flowchart showing switching to split retard combustion.

As having been described as above, in case low λ and a high exhaust temperature are required for DPF regeneration, S-poisoning release, etc, the combustion mode is switched to the split retard combustion mode of the present invention. More specifically, as shown in the flowchart of FIG. 22, in step S101, fuel of a fuel injection quantity for the preliminary combustion (refer to FIG. 19) is injected at the fuel injection timing for the preliminary combustion (refer to FIG. 18). Then, in step S102, fuel injection for the main combustion is performed at a retarded fuel injection timing (refer to FIG. 20).

Referring back to FIG. 3, after the combustion mode of the engine is switched from the normal lean combustion mode to the split retard combustion mode of this invention for regeneration of DPF in step S101, the processing goes to step S102.

Figure 23:
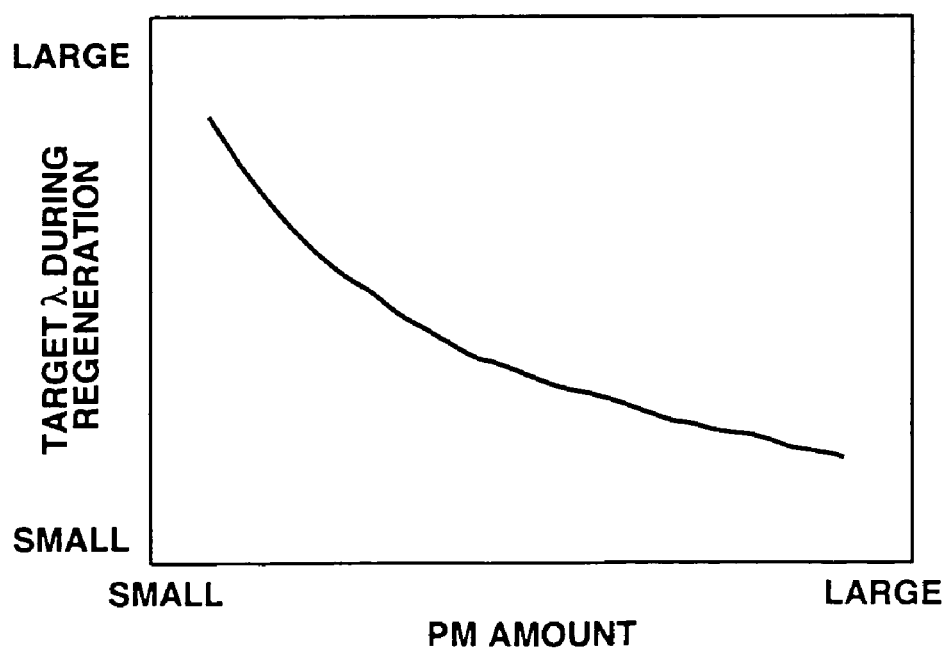
FIG. 23 is a graph showing a relation between a PM amount and target λ during regeneration.

In step S102, the exhaust λ is controlled to a target value. In regeneration of DPF, the target value of exhaust λ varies depending upon a variation of the PM amount. Accordingly, the exhaust pressure at the DPF inlet side is detected and compared with a reference exhaust pressure at the engine operating condition (engine speed Ne and load Q), thereby estimating the PM amount, determining a target λ corresponding to the PM amount shown in FIG. 23 and controlling the exhaust λ to the target value.

Control to the target λ, though will be described in detail later, is performed while making torque correction since the torque is lowered by the retard combustion.

In step S103, it is determined whether or not the temperature of DPF exceeds a target upper limit T22.

If the temperature of DPF>T22, the temperature of DPF exceeds the upper limit during regeneration, so the processing goes to step S110 where the fuel injection timing of the main combustion is advanced to lower the exhaust gas temperature.

In step S104, it is determined whether or not the temperature of DPF 14 is lower than a target lower limit T21.

If DPF temperature<T21, the DPF temperature is lowered than the lower limit during regeneration of DPF 14, so the processing goes to step S109 where the fuel injection timing of the main combustion is retarded to raise the exhaust gas temperature.

In step S105, it is determined whether or not a predetermined time t dpfreg has elapsed from start of DPF regeneration. If the predetermined time has elapsed, PM accumulated on DPF 14 is burned off completely, so the processing goes to step S106.

In step S106, the combustion mode is switched from the split retard combustion mode of this invention to the normal combustion mode to stop heating of DPF 14 since DPF regeneration is completed.

In step S107, the reg flag is cleared (=0) since DPF regeneration is completed.

In step S108, the rec flag is set (=1) to start a fusion damage preventing mode since if there remains PM on DPF 14 though the DPF regeneration is completed, rapid increase of the exhaust λ may possibly allow the PM to burn at DPF 14 all at once and cause fusion damage.

Figure 4:
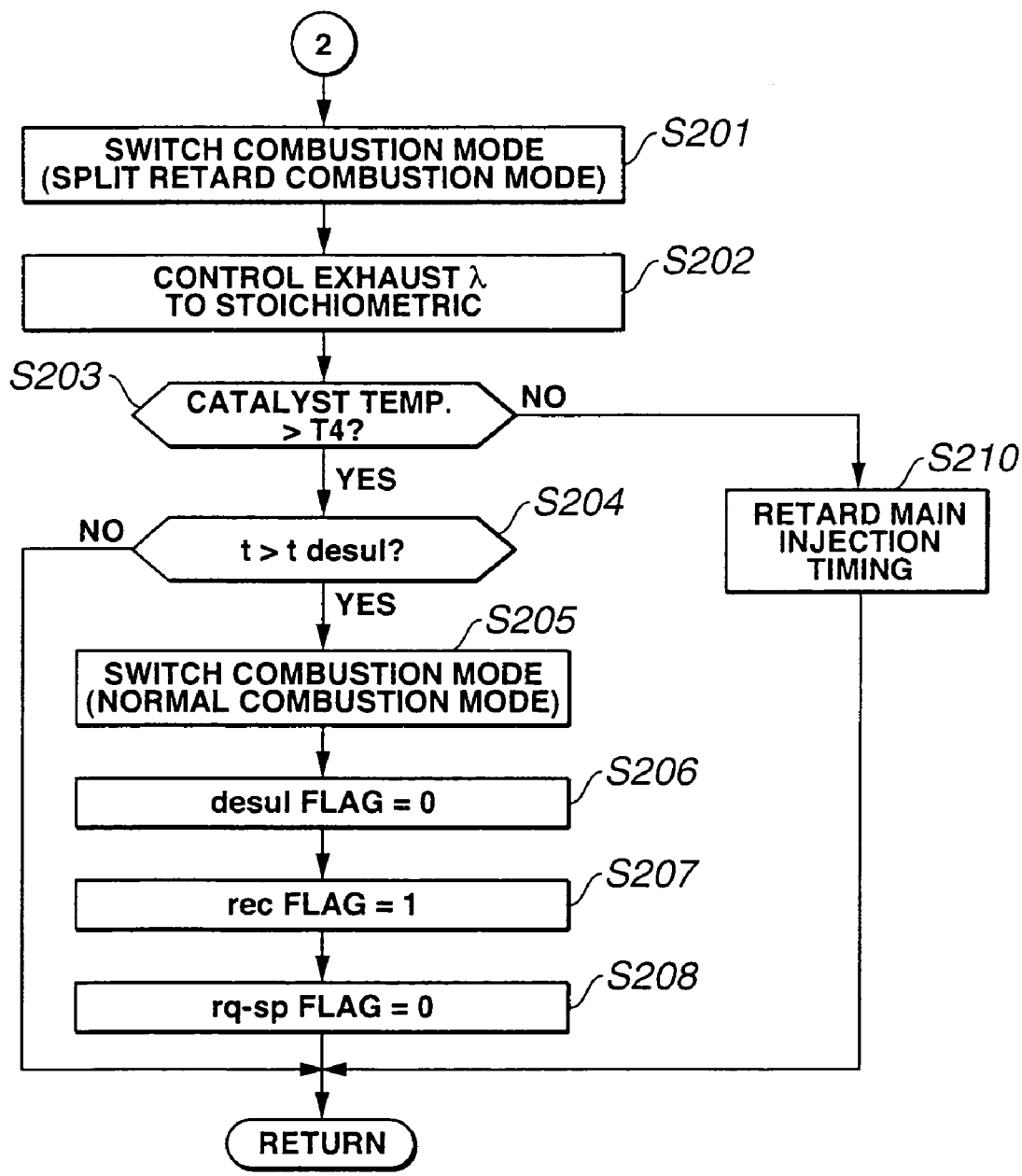
FIG. 4 is a flowchart (part 3) showing an exhaust gas purification control.

Then, the control for the S-poisoning releasing mode of FIG. 4 will be described. In case the S (sulfur) amount of NOx trap catalyst 13 exceeds a predetermined amount S1 so that the rq-desul flag is set (=1) and in response to this the processing flow of FIG. 8 which will be described later is executed to set the desul flag (=1), the processing flow of FIG. 4 is started.

In step S201, for releasing the S-poisoning of NOx trap catalyst 13, the combustion mode of the engine is switched from the normal lean combustion mode to the split retard combustion mode of the present invention.

In step s202, the exhaust λ is controlled to stoichiometric. Namely, the exhaust λ is controlled by setting the target exhaust λ at stoichiometric. Control to the target exhaust λ, though will be described in detail later, is executed while performing torque correction since the retard combustion causes the torque to be lowered.

In step S203, it is determined whether or not the catalyst temperature is higher than a predetermined temperature T4. For example, T4 is set at 600° C. since in case of NOx trap catalyst of Ba the atmosphere of rich to stoichiometric needs to be 600° C. or higher.

If the catalyst temperature is lower than the predetermined temperature T4, the processing goes to step S210 where the fuel injection timing of the main combustion is retarded to raise the exhaust gas temperature.

In step S204, it is determined whether, or not a predetermined time t desul has elapsed from the start of the S-poisoning release mode. If the predetermined time has elapsed, it is determined that the S-poisoning release is completed and the processing goes to step S205.

In step s205, since the S-poisoning release is completed, the combustion mode is switched from the split retard combustion mode of this invention to the normal combustion mode to stop heating of NOx trap catalyst 13. Of course, the stoichiometric operation is cancelled at the same time.

In step S206, since the S-poisoning release is completed, the desul flag is cleared (=0).

In step S 207, the rec flag is set (=1) to start a fusion damage preventing mode since if PM is accumulated on DPF 14 though S-poisoning release has been completed, rapid increase of the exhaust λ under such a high temperature condition may possibly allow the PM to burn at DPF 14 all at once and cause fusion damage.

In step S208, the rq-so flag is cleared (=0). By execution of S-poisoning release, NOx purge is caused at the same time since the NOx trap catalyst is exposed to stoichiometric. Thus, this is for canceling a NOx purge request (rich spike request) if having been made.

Figure 5:
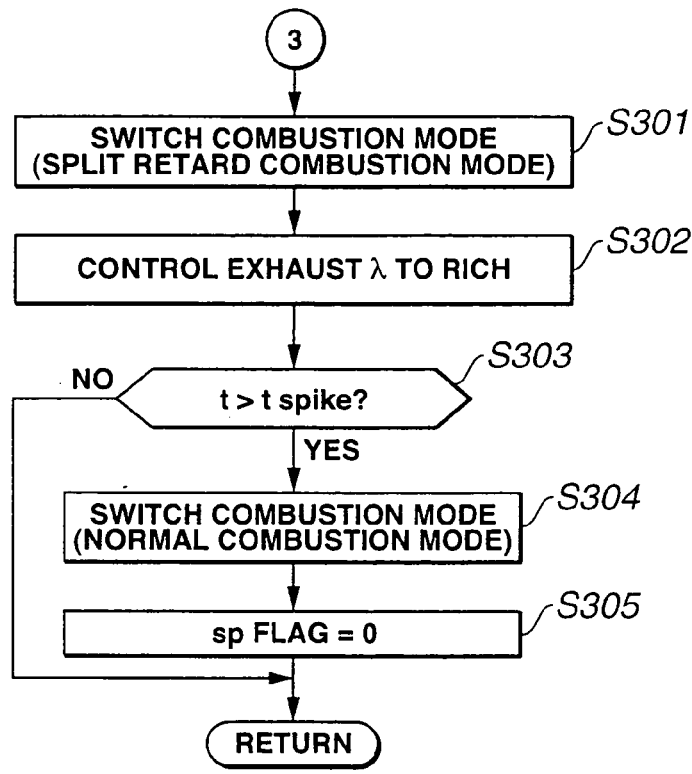
FIG. 5 is a flowchart (part 4) showing an exhaust gas purification control.
Figure 7:
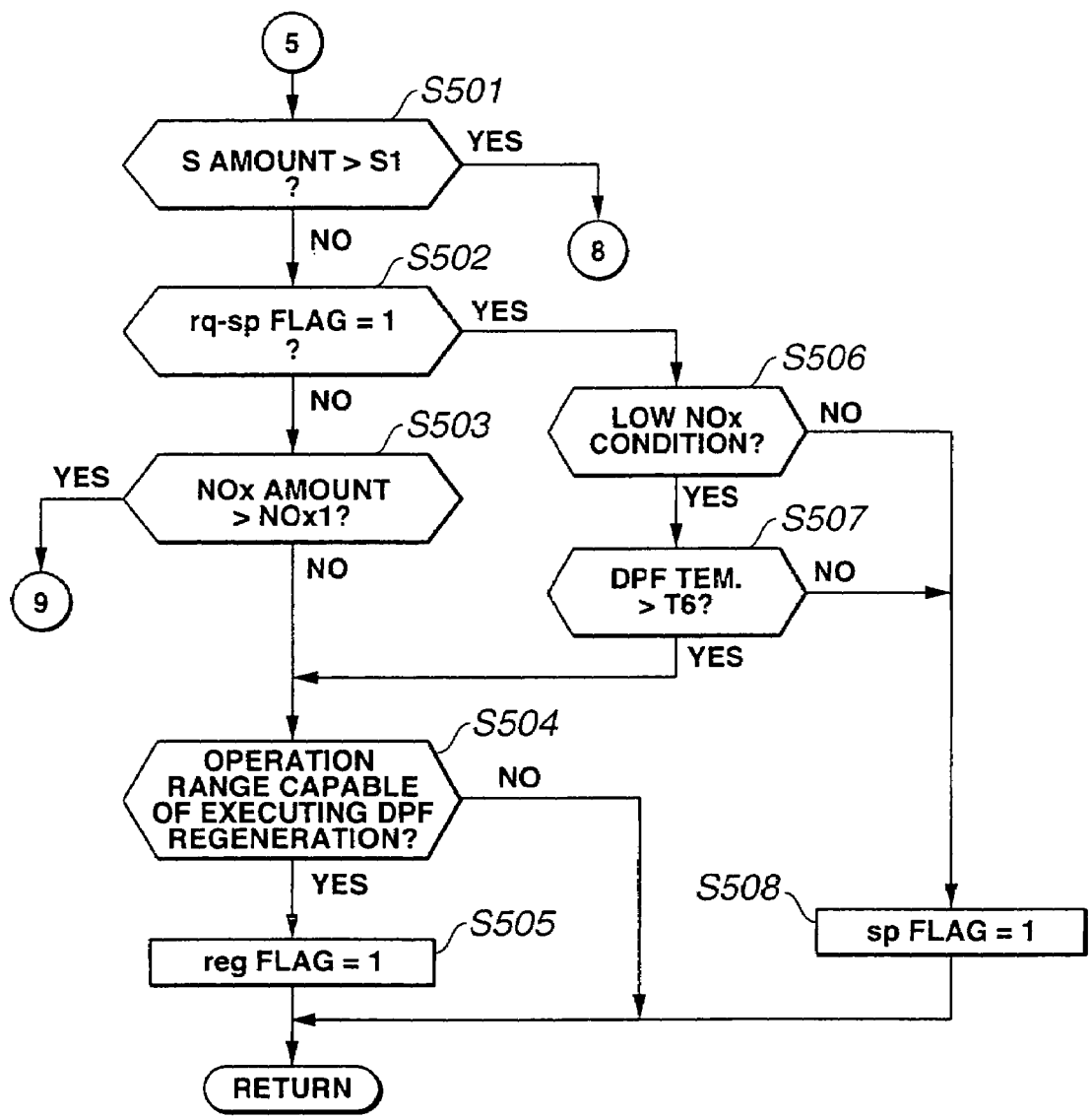
FIG. 7 is a flowchart (part 6) showing an exhaust gas purification control.
Figure 8:
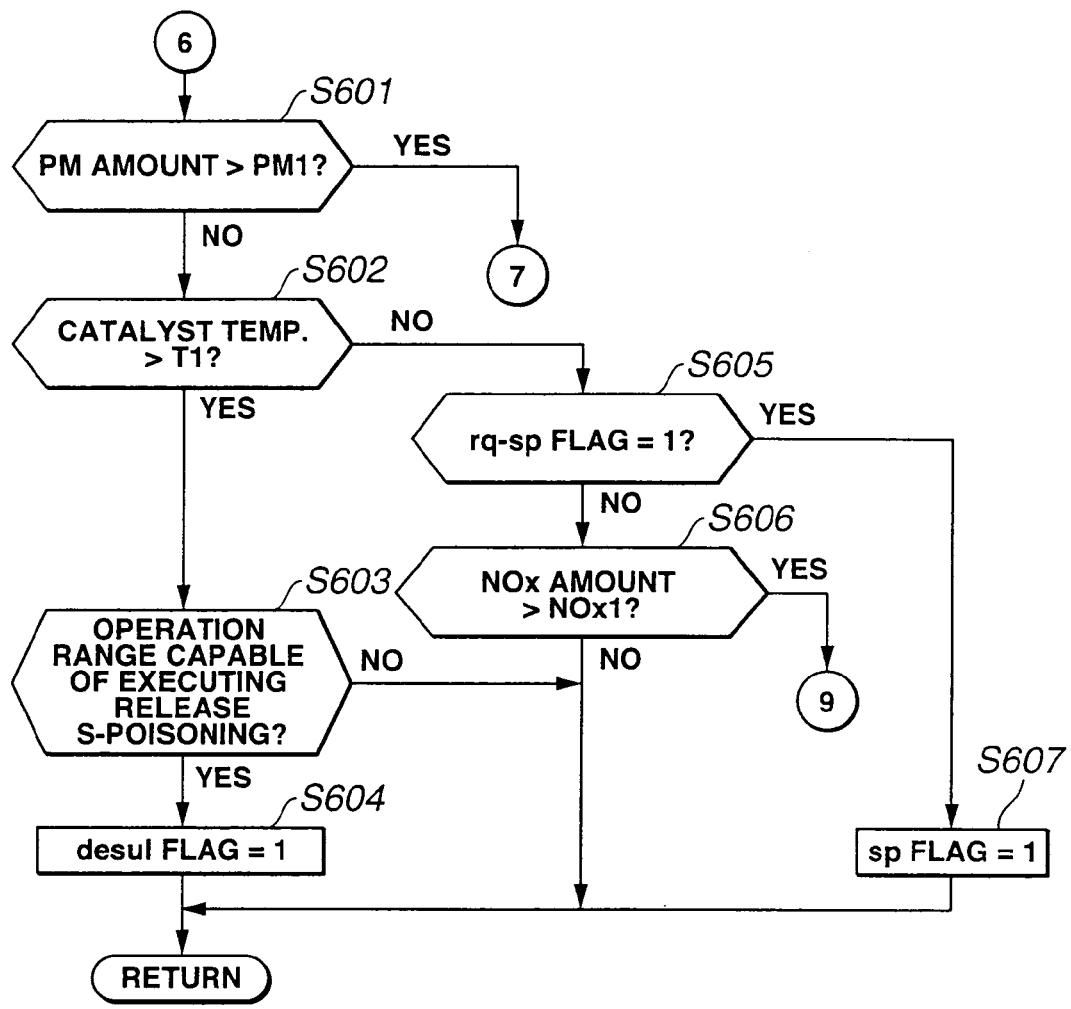
FIG. 8 is a flowchart (part 7) showing an exhaust gas purification control.

Then, the rich spike mode (NOx purge mode) of FIG. 5 will be described. When the NOx amount of NOx trap catalyst 13 exceeds a predetermined amount NOx1 so that the rq-sp flag is set (=1) and in response to this the processing flow of FIG. 7 or FIG. 8 is executed so that the sp flag is set (=1), the processing flow of FIG. 5 is started.

In step S301, for the NOx purge of NOx trap catalyst 13, the combustion mode of the engine is switched from the normal lean combustion mode to the split retard combustion mode of the present invention.

In step S302, the exhaust λ is controlled to rich. Namely, the exhaust λ is controlled by setting the target λ to rich. Control to the target λ, which will be described in detail later, is performed while making torque correction since the torque is lowered by the retard combustion.

In step S303, it is determined whether or not a predetermined time t spike has elapsed from the start of the rich spike mode. If the predetermined time has elapsed, it is determined that the NOx purge is completed and the flow goes to step S304.

In step S304, since the NOx purge is completed, the combustion mode is switched from the split retard combustion mode to the normal combustion mode. Of course, the rich operation is cancelled at the same time.

In step S305, since the NOx purge is completed, the sp flag is cancelled (=0).

Figure 6:
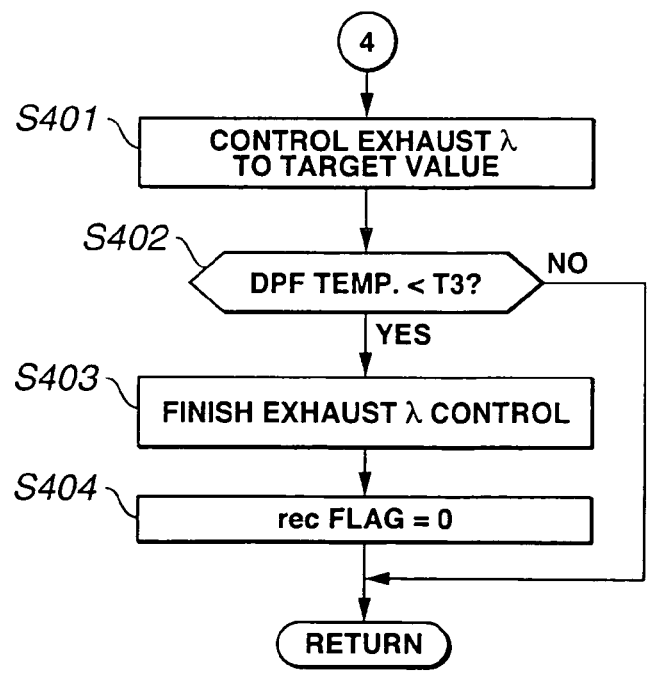
FIG. 6 is a flowchart (part 5) showing an exhaust gas purification control.

Then, the fusion damage preventing mode of FIG. 6 will be described. When the DPF generation or the S-poisoning release is completed and the flow of FIG. 3 or FIG. 4 is executed so that the rec flag is set (=1), the processing flow of FIG. 6 is started.

In step S401, since DPF 14 is still in a high temperature condition immediately after the DPF regeration or the like and therefore rapid control of the exhaust λ to rich may possibly cause the remaining PM of DPF 14 to burn all at once and thereby cause fusion damage, the exhaust λ is controlled to a target value, for example, controlled so that λ≦1.4. In the meantime, in the fusion damage preventing mode, the exhaust gas temperature is desired to be low, so that the exhaust λ is controlled to the target value, not by the split retard combustion mode of this invention but by the normal combustion mode.

In step S402, it is determined whether or not the temperature of DPF 14 is lower than a predetermined temperature T3 (e.g., 500° C.) at which there is not any possibility of rapid oxidation of the PM. If the temperature of DPF 14 is higher than T3, control of the exhaust λ is continued. If the temperature of DPF 14 becomes lower than T3, damage of DPF 14 can be avoided even if the oxygen concentration becomes equal to that of the atmosphere and therefore the processing flow goes to step S403.

In step 403, since there is not any possibility of fusion damage of DPF 14, control of the exhaust λ is finished.

In step S404, since the fusion damage preventing mode is finished, the rec flag is cleared (=0).

Then, the first regeneration priority order determining flow of FIG. 7 will be described. When a DPF regeneration request (rq-DPF flag=1) is issued, the processing flow of FIG. 7 is started. In the meantime, this flow determines the priority order when the DPF regeneration request and the S-poisoning release request or the NOx purge request are issued at the same time.

In step S501, by the method similar to step S13, it is determined whether or not the S amount exceeds a predetermined amount S1 and it is the time to release S-poisoning.

If the S amount>S1, the processing goes to step S801 of the processing flow of FIG. 10 to set the rq-desul flag (=1) and issue a S-poisoning release request. In this instance, by the processing flow of FIG. 8 the priority order is determined.

In case the S accumulation amount<S1, the processing goes to S502.

In step S502, it is determined whether or not the rq-sp flag is set (=1), i.e., whether or not the NOx purge request (rich spike request) is issued. If not issued, the processing goes to step S503.

In step 503, by the technique similar to step S14, it is determined whether or not the NOx amount exceeds a predetermined amount NOx1 and it is the time to purge the NOx trap.

If the NOx amount>NOx1, the processing goes to step S901 of the flow of FIG. 11 to set the rq-sp flag (=1) and issue the NOx purge request (rich spike request).

If it is determined in step S503 that the NOx amount<NOx1, this is the case where only the DPF regeneration request is issued, so the processing goes to step S504.

In step S504, it is determined whether or not the engine operating condition is in a range capable of executing DPF regeneration and S-poisoning release (i.e., operation range other than low-speed and low-load range, in which an extent of temperature rise is relatively small and an extent of deterioration of exhaust efficiency does not exceed an allowable value) If the engine operating condition is in the range capable of executing DPF regeneration, the processing goes to step S505 to set the reg flag (=1) and proceed to DPF regeneration.

If it is determined in step S502 that the rq-sp flag is set (=1), this the case where the DPF regeneration request and the NOx purge request are issued at the same time, so that the processing goes to step S506.

In step S506, it is determined whether or not the engine is operating under a condition where emission of NOx is small (e.g., steady-state). At an engine operating condition in which emission of NOx is small, there is scarcely caused any deterioration of the exhaust gas at a tail pipe even if regeneration of NOx trap catalyst 13 is delayed a little, so that it is preferable to give priority to DPF regeneration that has a large influence on the operation of the engine. Accordingly, in this instance, the processing goes to step S507.

At an engine operating condition in which NOx emission is large (e.g., accelerating condition), it is desired to give priority to regeneration of NOx trap catalyst 13 with a view to preventing deterioration of the exhaust gas at the tail pipe. Accordingly, in this instance, the processing goes to step S508 to set the sp flag (=1) and proceed to NOx purge (rich spike).

In step S507, it is determined whether or not the temperature of the DPF is higher than T6 at which an oxidation catalyst carried on DPF 14 is activated. If lower than T6 at the time to start raising the temperature of DPF 14, it is preferable to give priority to regeneration of NOx trap catalyst 13. This is because even if it is started to raise the temperature of DPF 14, it takes a long time for DPF 14 to be heated up to a temperature at which regeneration of the DPF can be executed and there is a possibility that deterioration of NOx is caused at the tail pipe during raising of the temperature. Accordingly, also in this case, the processing goes to step S508 to set the sp flag (=1) and proceeds to NOx purge (rich spike).

If it is determined in step S507 that the DPF temperature>T6, the processing goes to steps S504 and S505 to give priority to the DPF regeneration.

Then, the second regeneration priority order determining flow of FIG. 8 will be described. If the S-poisoning cancel request (rq-desul flag=1) is issued, the processing flow of FIG. 8 is started. In the meantime, this processing flow is for determining the priority order when the S-poisoning cancel request and the NOx purge request are issued at the same time.

In step S601, it is determined, after issuance of the S-poisoning cancel request and by the technique similar to step S12, whether or not the PM amount exceeds a predetermined amount PM1 and it is the time to regenerate DPF 14.

If the PM amount>PM1, the processing goes to step S701 of the processing flow of FIG. 9 to set the rq-DPF flag (=1) and issue the DPF regeneration request. In this instance, by the processing flow of FIG. 7, the priority order is determined.

If the PM amount<PM1, the processing goes to step S602.

In step S602, it is determined whether or not the catalyst temperature is higher than predetermined temperature T1. If higher, the processing goes to step S603.

In step S603, it is determined whether or not the engine operating condition is in an operation range capable of executing DPF regeneration and S-poisoning release (i.e., operation range other than low-speed and low-load range, in which an extent of temperature rise is relatively small and an extent of deterioration of exhaust efficiency does not exceed an allowable value). If the engine operating condition is in the range capable of executing S-poisoning release, the processing goes to step S604 to set the desul flat (=1) and proceeds to S-poisoning release.

If it is determined in step S602 that the catalyst temperature<T1, it is preferable to give priority to NOx purge. This is because even if it is started to raise the temperature of DPF 14, it takes a long time for the catalyst to be heated up to the temperature at which S-poisoning release can be executed and there is a possibility that deterioration of NOx is caused at the tail pipe during raising of the temperature of the catalyst. Accordingly, the processing goes to step S605.

In step S605, it is determined whether or not the rq-sp flag is set (=1), i.e., it is determined whether or not the NOx purge request is issued. If issued, the processing goes to step S607 to set the sp flag (=1) and proceeds to NOx purge (rich spike).

If the rq-sp flag is not set, the processing goes to step S606.

In step S606, it is determined, after issuance of the S-poisoning cancel request and by the technique similar to step S14, whether or not the NOx amount exceeds the predetermined value NOx1 and it is the time to purge the NOx trap.

If the NOx amount>NOx1, the processing goes to step S901 of the processing flow of FIG. 11 to set the rq-sp flag (=1).

Figure 12:
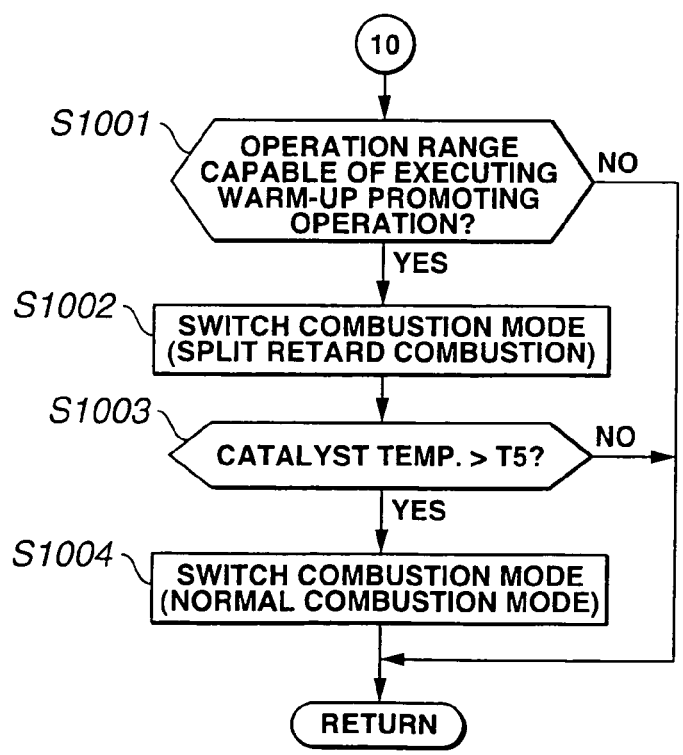
FIG. 12 is a flowchart (part 11) showing an exhaust gas purification control.

Then, control of a warm-up promoting mode of FIG. 12 will be described. This control is executed when the catalyst temperature is equal to or lower than T5.

Figure 24:
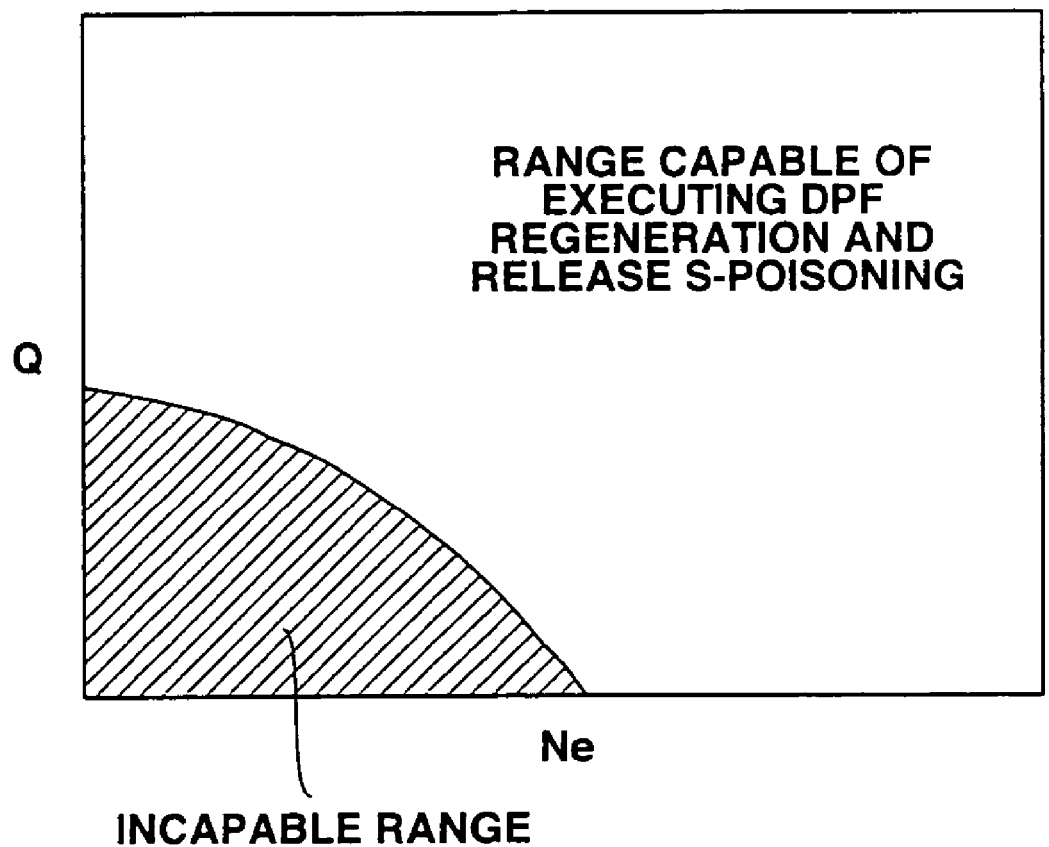
FIG. 24 is a view showing an operation range capable of executing DPF regeneration and S (sulfur)-poisoning release.

In step S1001, it is determined whether or not the operation of the engine is in an operation range capable of executing a warm-up promoting operation. In this connection, since the warm-up promoting operation is executed by the split retard combustion mode of the present invention, it is determined whether or not the operation of the engine is in the range capable of executing the split retard combustion mode. Specifically, the range capable of executing DPF generation and S-poisoning release shown in FIG. 24 is regarded as the operation range capable of executing the warm-up promoting operation, and if the engine operating condition is in this range, the processing goes to step S1002.

In step S1002, for promotion of warm-up, the combustion mode of the engine is switched from the normal lean combustion to the split retard combustion mode of the present invention. By switching to the combustion mode of this invention, the exhaust gas temperature becomes high, thus making it possible to promote warm-up of the catalyst.

Also in this instance, the target λ is set and the exhaust λ is controlled to the target λ. Control to the target λ, which will be described in detail later, is performed while making torque correction since the torque is lowered by the retard combustion.

In step S1003, it is determined whether or not the catalyst temperature is higher than T5, i.e., its activation temperature. If the catalyst temperature>T5, the processing goes to S1004 to switch the combustion mode from the split retard combustion mode of this invention to the normal combustion mode and finish the warm-up promoting operation.

Then, the control to the target λ during the split retard combustion mode of this invention and torque correction will be described.

The retard combustion causes the torque to reduce, so that it is important how to compensate for reduction of the torque while maintaining the target λ. Further, since the more the exhaust gas temperature is raised by retarding the fuel injection timing for the main combustion, the more the torque reduces, so that it is necessary to deal with this problem. Further, particularly in case of the warm-up promoting mode, if the temperatures at portions of the engine are low, the combustion efficiency becomes lower and the torque reduces much more though the fuel injection timing for the main combustion is the same. Thus, it is also necessary to deal with this problem.

Figure 25:
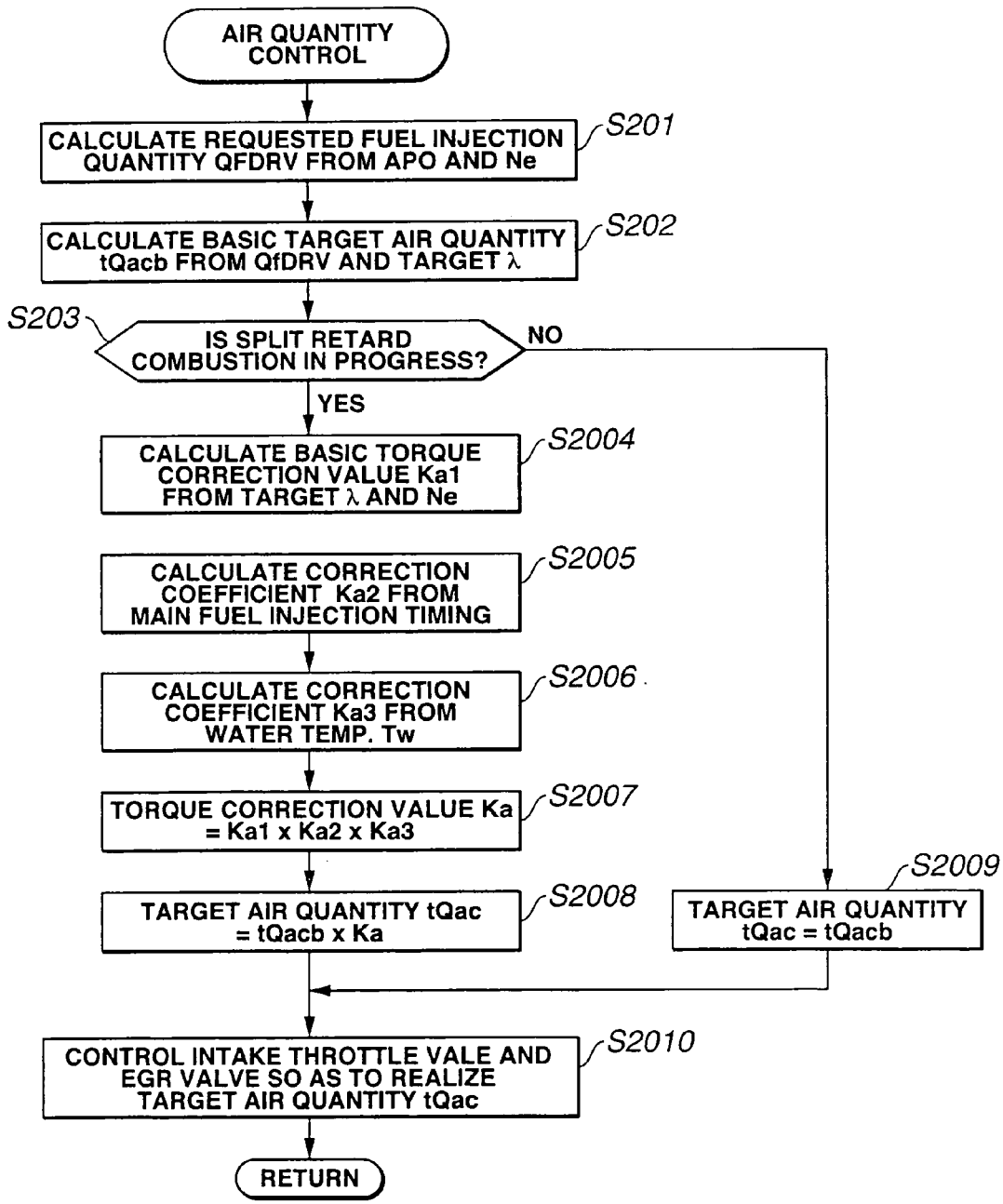
FIG. 25 is a flowchart showing an air quantity control including torque correction.

FIG. 25 is a flowchart for intake air quantity control including torque correction.

In step S2001, a requested fuel injection quantity QFDRV equated to a requested engine torque is calculated from accelerator opening degree APO and engine speed Ne.

In step S2002, basic target air quantity tQacb is calculated from target fuel injection quantity QFDRV and target λ. In the meantime, the target λ, as having described hereinbefore, is determined so as to meet with the DPF generation, S-poisoning release, NOx purge and warm-up acceleration, respectively.

In step S2003, it is determined whether or not the split retard combustion mode is in progress. If the split retard combustion mode is in progress, the processing goes to step S2004.

Figure 27:
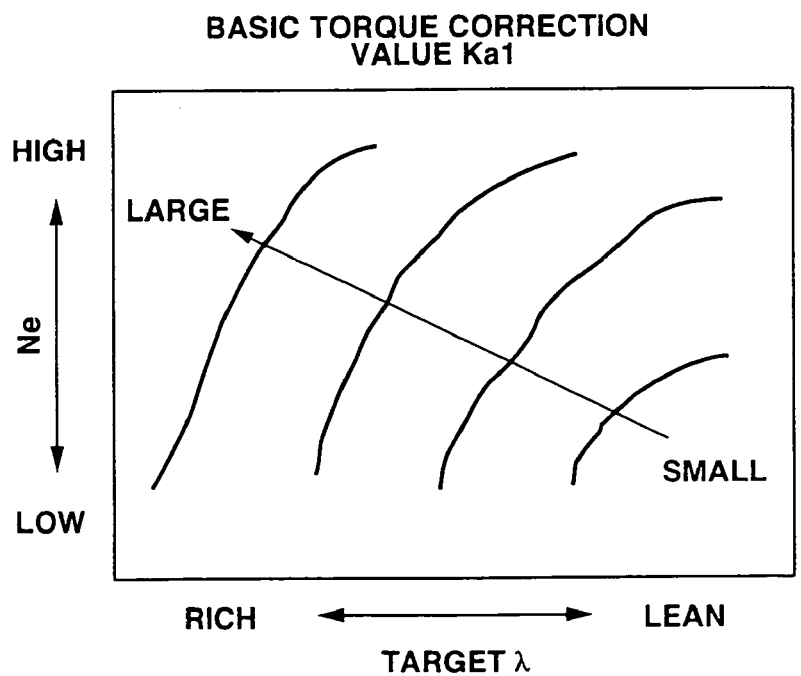
FIG. 27 is a map for calculation of a basic torque correction value.

In step S2004, a basic torque correction value Ka1 is calculated from the target λ and engine speed Ne and with reference to such a map as shown in FIG. 27. In this connection, if the target λ becomes smaller than 1, the torque reduces, so that Ka1 is made larger as the target becomes smaller than 1. Further, if the engine speed Ne becomes higher, a variation of the crank angle is caused even if the combustion time is the same, thus causing the torque to reduce. Thus, Ka1 is made lager as the engine speed Ne becomes higher.

Figure 28:
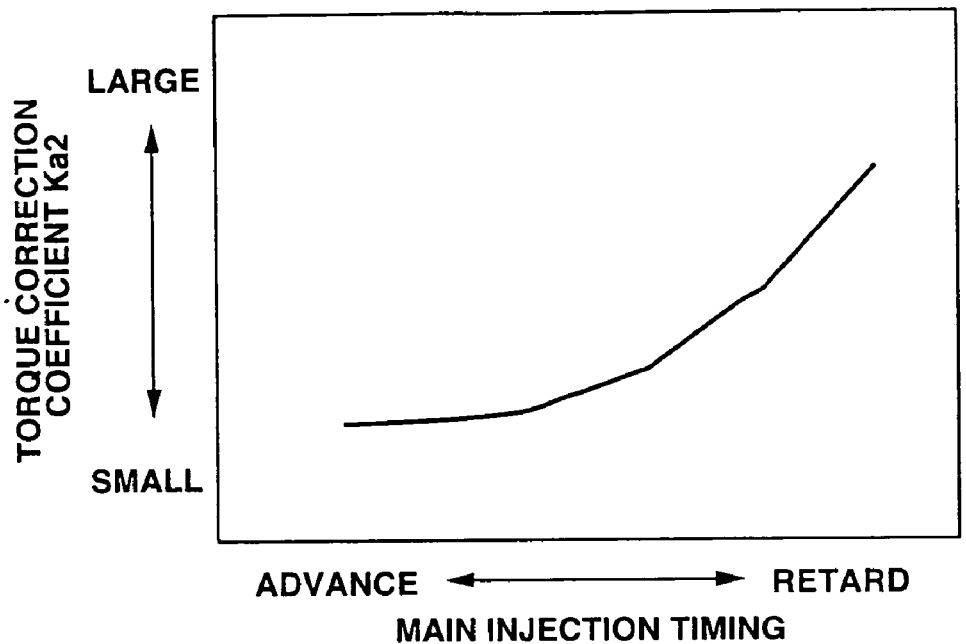
FIG. 28 is a graph showing a relation between a main injection timing and a torque correction coefficient.

In step S2005, a correction coefficient Ka2 for the basic torque correction value is calculated from the fuel injection timing (main injection timing) during the split retard combustion mode. Specifically, with reference to the table shown in FIG. 28, the correction coefficient Ka2 is made larger as the main injection timing is retarded more. This is because the more the main injection timing is retarded, the more the torque reduces.

Figure 29:
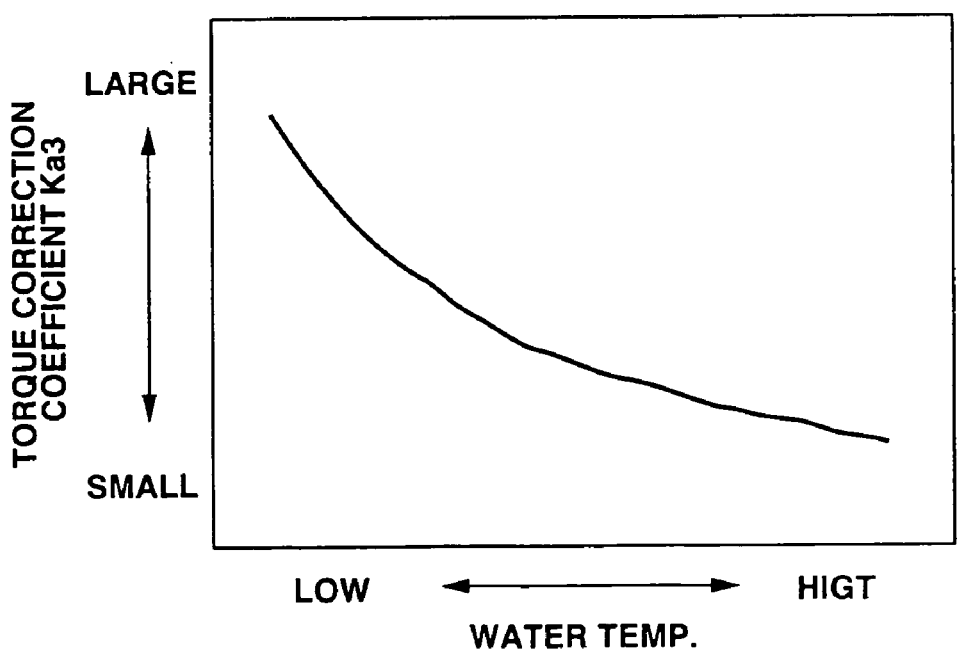
FIG. 29 is a graph showing a relation between a cooling water temperature and a torque correction coefficient.

In step s2006, a correction coefficient Ka3 for the basic torque correction value is calculated from a cooling water temperature Tw which is a parameter representative of an engine temperature. Specifically, with reference to the table shown in FIG. 29, the correction coefficient Ka3 is made larger as the cooling water temperature Tw is lower. This is because the combustion efficiency becomes worse as the cooling water temperature Tw becomes lower, thus more reducing the torque. This correction is effective particularly at the warm-up accelerating mode.

In step S2007, a final torque correction value Ka=Ka1×Ka2×Ka3 is calculated from the basic torque correction value Ka1 and the correction coefficients Ka2, Ka3.

In step S2008, for torque correction, a target air quantity tQac=tQacb×Ka is calculated by multiplying the basic target air quantity tQacb by the torque correction value Ka.

On the other hand, if it is determined in step S2003 that the split retard combustion mode is not in progress, the processing goes to step S2009 to regard the basic target air quantity tQacb as the final target air quantity tQac=tQacb as it is.

After steps S2008 and S2009, the processing goes to step S2010 to control the intake throttle valve and the EGR valve so as to realize the target air quantity tQac. More specifically, the intake throttle valve is controlled so as to realize the target air quantity tQac and in addition to this, for fine adjustment, the actual air quantity Qac is detected by an airflow meter and the EGR valve is feed-back controlled so that Qac=tQac.

Figure 26:
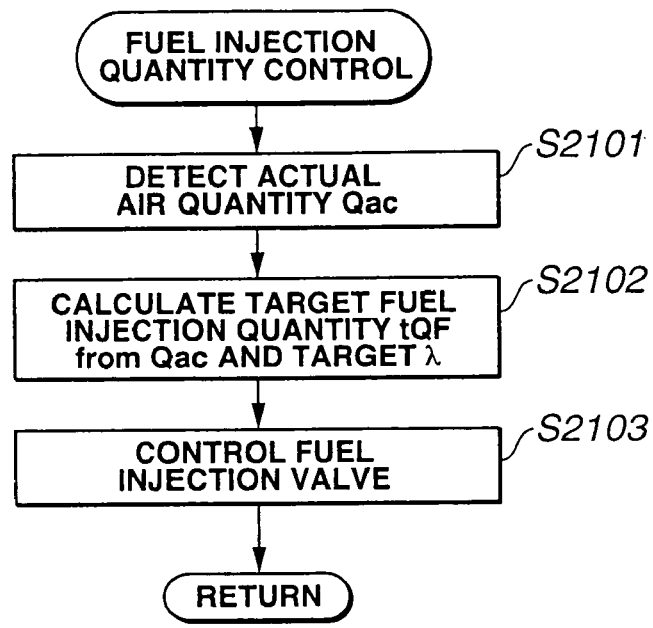
FIG. 26 is a flowchart showing a fuel injection quantity control.

FIG. 26 shows a flowchart for the fuel injection quantity control.

In step S2101, the actual air quantity Qac is detected by the airflow meter.

In step S2102, the target fuel injection quantity tQF is calculated from the actual air quantity Qac and the target λ.

In step S2103, the fuel injection valve is controlled so as to attain the target fuel injection quantity tQF.

From the above, it will be understood that during the split retard combustion mode, the target air quantity to be supplied to the engine is corrected so as to increase by the torque correction value and the target fuel injection quantity is calculated from the actual air quantity and the target, thereby controlling the fuel injection valve, whereby reduction of torque can be suppressed while realizing the target λ.

Further, by correcting the above-described torque correction value in accordance with the fuel injection timing for the main combustion (main injection timing), a torque variation due to a variation of the main injection timing can be dealt with.

Further, by correcting the above-described torque correction value in accordance with the engine temperature, particularly the cooling water temperature representative thereof, reduction of torque due to the low temperature at the warm-up promoting mode can be dealt with.

Further, by calculating the above-described basic value of the torque correction value (basic torque correction value) from the target λ and the engine speed, reduction of torque due to the target λ being made richer and reduction of toque due to increase of the engine speed can be dealt with.

From the foregoing, it will be understood that by raising the incylinder temperature by the preliminary combustion and producing the main combustion after an end of the preliminary combustion according to the present invention, premixed combustion is attained by the main combustion, thus making it possible to raise the exhaust temperature and attain a rich air/fuel ratio without deteriorating smoke emission. Further, reduction in torque will be unavoidably caused by retard combustion. Such reduction in torque can be suppressed while realizing a target air/fuel ratio by such a control of fuel and air to the engine, i.e., by determining a target air quantity by adding an increase correction to the target air quantity based on a torque correction value and determining a target fuel injection quantity by calculating the target fuel injection quantity from an actual air quantity and a target air/fuel ratio.

The entire contents of Japanese Patent Application P2003-279629 (filed Jul. 25, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A combustion control apparatus for an internal combustion engine having an exhaust gas purifier in an exhaust passage, comprising a controller that controls supply of fuel and air to the engine;

the controller being configured to:

produce preliminary combustion at or near compression top dead center and main combustion after an end of the preliminary combustion under a predetermined condition based on a condition of the exhaust gas purifier;

determine a target air quantity by adding an increase correction to the target air quantity based on a torque correction value and determine a target fuel injection quantity by calculating the target fuel injection quantity from an actual air quantity and a target air/fuel ratio; and determine a fuel injection quantity for the preliminary combustion in a way as to enable an incylinder temperature at a time of fuel injection for the main combustion to be higher than a self-ignitable temperature.

2. A combustion control apparatus according to claim 1, wherein the controller is further configured to correct the torque correction value in accordance with a fuel injection timing for the main combustion.

3. A combustion control apparatus according to claim 1, wherein the controller is further configured to correct the torque correction value in accordance with an engine temperature.

4. A combustion control apparatus according to claim 3, wherein the controller is further configured to use a cooling water temperature as the engine temperature.

5. A combustion control apparatus according to claim 1, wherein the controller is further configured to calculate a basic value of the torque correction value from the target air/fuel ratio and an engine speed.

6. A combustion control apparatus according to claim 1, wherein an interval between a combustion start timing of the main combustion and a combustion start timing of the preliminary combustion is equal to or larger than 20° in crank angle.

7. A combustion control apparatus according to claim 1, wherein an interval between a combustion end timing of the main combustion and compression top dead center is equal to or larger than 50° in crank angle.

8. A combustion control apparatus according to claim 1, wherein the controller is further configured to control an exhaust gas temperature of the engine by varying a fuel injection timing for the main combustion.

9. A combustion control apparatus according to claim 1, wherein the exhaust gas purifier includes a particulate filter to collect particulate matter in an exhaust gas, and the controller is further configured to increase a temperature of the particulate filter to burn off the particulate matter accumulated on the particulate filter thereby regenerating the particulate filter under the predetermined condition based on the condition of the exhaust gas purifier.

10. A combustion control apparatus according to claim 1, wherein the exhaust gas purifier includes a NOx trap catalyst to trap NOx in an exhaust gas when an exhaust air/fuel ratio is lean, and the controller is further configured to make the exhaust air/fuel ratio richer and purge the NOx trapped by the NOx trap catalyst under the predetermined condition based on the condition of the exhaust gas purifier.

11. A combustion control apparatus according to claim 1, wherein the exhaust gas purifier includes a NOx trap catalyst to trap NOx in an exhaust gas when an exhaust air/fuel ratio is lean, and the controller is further configured to increase an exhaust gas temperature of the engine and release S-poisoning of the NOx trap catalyst under the predetermined condition based on the condition of the exhaust gas purifier.

12. A combustion control apparatus according to claim 1, wherein the controller is further configured to warm up the exhaust gas purifier under the predetermined condition based on the condition of the exhaust gas purifier, which is a condition of the exhaust gas purifier being cold.

13. A combustion control apparatus for an internal combustion engine having an exhaust gas purifier in an exhaust passage, comprising:
means for producing preliminary combustion at or near compression top dead center and main combustion after an end of the preliminary combustion under a predetermined condition based on a condition of the exhaust gas purifier;
means for determining a target air quantity by adding an increase correction to the target air quantity based on a torque correction value and determining a target fuel injection quantity by calculating the target fuel injection quantity from an actual air quantity and a target air/fuel ratio; and
means for determining a fuel injection quantity for the preliminary combustion in a way as to enable an incylinder temperature at a time of fuel injection for the main combustion to be higher than a self-ignitable temperature.

14. A combustion control method for an internal combustion engine having an exhaust gas purifier disposed in an exhaust passage, the method comprising:
producing preliminary combustion at or near compression top dead center and main combustion after an end of the preliminary combustion under a predetermined condition based on a condition of the exhaust gas purifier;
determining a target air quantity by adding an increase correction to the target air quantity based on a torque correction value and determining a target fuel injection quantity by calculating the target fuel injection quantity from an actual air quantity and a target air/fuel ratio; and
determining a fuel injection quantity for the preliminary combustion in a way as to enable an incylinder temperature at a time of fuel injection for the main combustion to be higher than a self-ignitable temperature.

15. A combustion control method according to claim 14, further comprising correcting the torque correction value in accordance with a fuel injection timing for the main combustion.

16. A combustion control method according to claim 14, further comprising correcting the torque correction value in accordance with an engine temperature.

17. A combustion control method according to claim 16, wherein the correcting comprises using a cooling water temperature as the engine temperature.

18. A combustion control method according to claim 14, further comprising calculating a basic value of the torque correction value from the target air/fuel ratio and an engine speed.

19. A combustion control method according to claim 14, wherein an interval between a combustion start timing of the main combustion and a combustion start timing of the preliminary combustion is equal to or larger than 20° in crank angle.

20. A combustion control method according to claim 14, wherein an interval between a combustion end timing of the main combustion and compression top dead center is equal to or larger than 50° in crank angle.

21. A combustion control method according to claim 14, further comprising controlling an exhaust gas temperature of the engine by varying a fuel injection timing for the main combustion.

22. A combustion control method according to claim 14, wherein the exhaust gas purifier includes a particulate filter to collect particulate matter in an exhaust gas, the method further comprising increasing a temperature of the particulate filter to burn off the particulate matter accumulated on the particulate filter thereby regenerating the particulate filter under the predetermined condition based on the condition of the exhaust gas purifier.

23. A combustion control method according to claim 14, wherein the exhaust gas purifier includes a NOx trap catalyst to trap NOx in an exhaust gas when an exhaust air/fuel ratio is lean, the method further comprising making the exhaust air/fuel ratio richer and purging the NOx trapped by the NOx trap catalyst under the predetermined condition based on the condition of the exhaust gas purifier.

24. A combustion control method according to claim 14, wherein the exhaust gas purifier includes a NOx trap catalyst to trap NOx in an exhaust gas when an exhaust air/fuel ratio is lean, the method further comprising increasing an exhaust gas temperature of the engine and releasing S-poisoning of the NOx trap catalyst under the predetermined condition based on the condition of the exhaust gas purifier.

25. A combustion control method according to claim 14, further comprising warming up the exhaust gas purifier under the predetermined condition based on the condition of the exhaust gas purifier, which is a condition of the exhaust gas purifier being cold.

* * * * *